US008096069B2

(12) United States Patent
Ishikawa et al.

(10) Patent No.: US 8,096,069 B2
(45) Date of Patent: Jan. 17, 2012

(54) REPEATABLY DISPLACEABLE EMANATING ELEMENT DISPLAY

(75) Inventors: Muriel Y. Ishikawa, Livermore, CA (US); Edward K. Y. Jung, Bellevue, WA (US); Cameron A. Myhrvold, Medina, WA (US); Conor L. Myhrvold, Medina, WA (US); Nathan P. Myhrvold, Medina, WA (US); Clarence T. Tegreene, Bellevue, WA (US); Lowell L. Wood, Jr., Livermore, CA (US); Victoria Y. H. Wood, Livermore, CA (US)

(73) Assignee: The Invention Science Fund I, LLC

( * ) Notice: Subject to any disclaimer, the term of this patent is extended or adjusted under 35 U.S.C. 154(b) by 1165 days.

(21) Appl. No.: 11/518,551

(22) Filed: Sep. 6, 2006

(65) Prior Publication Data

US 2008/0055285 A1 Mar. 6, 2008

(51) Int. Cl.
*G09G 5/00* (2006.01)

(52) U.S. Cl. .............. 40/591; 40/587; 40/588; 40/589; 40/590; 40/592; 345/204

(58) Field of Classification Search .............. 345/1.1, 345/31, 204, 82, 46, 619; 340/815.4; 40/587–592
See application file for complete search history.

(56) References Cited

U.S. PATENT DOCUMENTS

| 5,134,390 | A | | 7/1992 | Kishimoto et al. |
| 5,736,955 | A | | 4/1998 | Roif |
| 5,791,966 | A | | 8/1998 | Capps et al. |
| 5,903,224 | A | * | 5/1999 | Reynolds ................ 340/815.45 |
| 6,265,984 | B1 | * | 7/2001 | Molinaroli ................ 340/815.4 |
| 6,377,238 | B1 | * | 4/2002 | McPheters .................... 345/156 |
| 6,466,183 | B1 | | 10/2002 | Yamamoto et al. |
| 6,641,041 | B2 | | 11/2003 | Olds et al. |
| 6,812,851 | B1 | * | 11/2004 | Dukach et al. ............ 340/815.4 |
| 6,822,772 | B2 | | 11/2004 | Eberl et al. |
| 6,932,485 | B2 | | 8/2005 | Hussaini et al. |
| 7,477,208 | B2 | * | 1/2009 | Matlock et al. ................ 345/31 |
| 2004/0100419 | A1 | | 5/2004 | Kato et al. |
| 2004/0207650 | A1 | | 10/2004 | Lin |
| 2004/0249518 | A1 | * | 12/2004 | Okoshi et al. ..................... 701/1 |
| 2005/0174308 | A1 | * | 8/2005 | Matlock et al. ................ 345/82 |
| 2005/0192727 | A1 | | 9/2005 | Shostak et al. |
| 2005/0237272 | A1 | * | 10/2005 | Josephson et al. ............. 345/46 |
| 2006/0005440 | A1 | * | 1/2006 | Young et al. .................... 40/590 |
| 2006/0038831 | A1 | * | 2/2006 | Gilbert ......................... 345/619 |
| 2006/0143957 | A1 | | 7/2006 | Salehi |

(Continued)

OTHER PUBLICATIONS

"Bombardier Global Express Ultra Long-Range Business Jet, Canada"; Aerospace-technology.com; printed on Aug. 18, 2006; pp. 1-3; http://www.aerospace-technology.com/project_printable.asp-?ProjectID=2218.

(Continued)

*Primary Examiner* — Quan-Zhen Wang
*Assistant Examiner* — Tony Davis

(57) ABSTRACT

One aspect relates to generating a repeatably displaceable emanating element display that may display at least part of an at least one synchronously modifiable oriented image based at least in part on alterable vehicle-related information, wherein the repeatably displaceable emanating element display may be synchronously modified as perceivable by a viewer at least partially by synchronizing an at least one repeatably displaceable display emanating element based at least in part on an orientation of the repeatably displaceable emanating element display as synchronously modified as perceivable by the viewer.

50 Claims, 15 Drawing Sheets

U.S. PATENT DOCUMENTS

| | | | |
|---|---|---|---|
| 2006/0146074 A1* | 7/2006 | Harrison | 345/660 |
| 2006/0180371 A1 | 8/2006 | Breed et al. | |
| 2006/0239018 A1* | 10/2006 | Jardin | 362/459 |
| 2007/0166148 A1* | 7/2007 | Middleton et al. | 415/118 |
| 2007/0247832 A1* | 10/2007 | Barker | 362/96 |
| 2008/0278408 A1* | 11/2008 | Strickland et al. | 345/1.1 |

OTHER PUBLICATIONS

"EON News, Lexus Launches a Holographic Marketing Campaign Based on EON's Holographic Display Technology in Times Square, NY and other Major US Locations"; Eonreality.com; printed on Aug. 18, 2006; pp. 1-3; http://www.eonreality.com/news/NewsFlash/news_flash102005.htm.

"Ford GloCar concept at the National Design Triennial exhibit: 'Inside Design Now'"; Cardesignnews.com; bearing dates of May 12, 2003 and 2003; printed on Aug. 22, 2006; pp. 1-2; http://www.cardesignnews.com/news/2003/030512ford-glocar/.

Fruhlinger, Joshua; "3D LED screen without those goofy glasses"; Engadget.com; bearing a date of Oct. 2, 2004; printed on Aug. 23, 2006; pp. 1 (p. 2 of 6); http://gadgets.engadget.com/entry/4845307085341518.

Hansen, Andrew J.; Rybacki, Richard M.; Smith, W. Garth; "Synthetic Vision in the Cockpit: 3D Systems for General Aviation"; Metavr.com; bearing a date of 2006; printed on Aug. 23, 2006; pp. 1-13; http://www.metavr.com/technology/papers/syntheicvision.html.

"Holographic Display"; Zerosign.net; bearing a date of Mar. 28, 2006; printed on Aug. 21, 2006; pp. 1-4; http://www.zerosign.net/index.php/2006/03/28/holographic-display/#comments.

"Holographic Display Interface Technology"; Imedi.org; bearing dates of Oct. 1, 2005 and Oct. 18, 2005; printed on Aug. 18, 2006; pp. 1-2; http://www.imedi.org/docs/references/hdit.htm.

"Holographic Imager"; Colossalstorage.net; bearing a date of 1998-2004; printed on Aug. 18, 2006; pp. 1-5; http://colossalstorage.net/display/3d_display.htm.

Keane, Mike; O'Neil, Kim; "Head Up Guidance at easyJet"; Aatl.net; printed on Aug. 18, 2005; pp. 1-9; http://www.aatl.net/publications/easyJet-HUGS.htm.

"Light Emitting Diodes (LEDs) for General Illumination, An OIDA Technology Roadmap Update 2002"; bearing dates of Oct. 2002 and 2002; pp. 1-111; OIDA Optoelectronics Industry Development Association; Washington, DC, USA; http://www.oida.org.

Lucente, Mark; "Interactive holographic displays: the first 10 years"; pp. 1-17; http://www.lucente.us/pubs/holo50/h50.pdf.

Lucente, Mark; "Interactive three-dimensional holographic displays: seeing the future in depth"; Alumni.media.mit.edu; bearing dates of Mar. 1997 and May 1997; printed on Aug. 18, 2006; pp. 1-11; http://alumni.media.mit.edu/~lucente/pubs/CG97/.

"Propeller display device"; Ponnet.com; bearing dates of 1998-2006 and Feb. 5, 2002; printed on Aug. 28, 2006; pp. 1-4; http://www.ponnet.com/projects/propeller/index1.0.php.

"Rafale Multi-Role Combat Fighter, France"; Airforce-technology.com: printed on Aug. 18, 2006; pp. 1-4; http://www.airforce-technology.com/project_printable.asp?ProjectID=1138.

"SpokePOV, Persistence of Vision for your Bike!"; Ladyada.net; bearing a date of Jun. 28, 2006; printed on Aug. 21, 2006; pp. 1-2; http://www.ladyada.net/make/spokepov/.

Staton, Ken; "Propeller Clock"; Staton.us; bearing dates of Dec. 6, 2005 and 2005; printed on Aug. 28, 2006; pp. 1-12; http://www.staton.us/electronics/prop_clock/Propeller_Clock.html.

"Welcome to Litewave, LED Under Car Lighting Kits 5 types available"; Litewave.co.uk; printed on Aug. 22, 2006; pp. 1-4; http://www.litewave.co.uk/.

Winslow, Lance; "Holographic Projection Glide Paths"; Peaceteambook.org; bearing a date of Nov. 11, 2005; printed on Aug. 18, 2006; pp. 1-3; http://www.peaceteambook.org/Reference-and-Education/Future-Concepts/67746;;Holographic-Projection-Glide-Paths.html.

* cited by examiner

2000 ─┐ generating a repeatably displaceable emanating element display that may display at least part of an at least one synchronously modifiable oriented image based at least in part on alterable vehicle-related information, wherein the repeatably displaceable emanating element display may be synchronously modified as perceivable by a viewer at least partially by synchronizing an at least one repeatably displaceable display emanating element based at least in part on an orientation of the repeatably displaceable emanating element display as synchronously modified as perceivable by the viewer 2002 generating a projectable repeatably displaceable emanating element display that may display the at least part of the at least one synchronously modifiable oriented image based at least in part on the alterable vehicle-related information 2030 generating an illumination repeatably displaceable emanating element display that may display the at least part of the at least one synchronously modifiable oriented image based at least in part on the alterable vehicle-related information 2032 wherein the generating a repeatably displaceable emanating element display that may display at least part of an at least one synchronously modifiable oriented image based at least in part on alterable vehicle-related information is performed at least partially in response to an activity 2010 wherein the generating a repeatably displaceable emanating element display that may display at least part of an at least one synchronously modifiable oriented image based at least in part on alterable vehicle-related information relies at least in part on the vehicle-related information that is at least partially transferred via a networked communication system 2012 wherein the generating a repeatably displaceable emanating element display that may display at least part of an at least one synchronously modifiable oriented image based at least in part on alterable vehicle-related information relies at least in part on the vehicle-related information that is at least partially transferred via an 802.11 communication system 2014

(A)

| 23a |
| 23b |
Key To FIG. 23

(A)
↓ wherein the generating a repeatably displaceable emanating element display that may display at least part of an at least one synchronously modifiable oriented image based at least in part on alterable vehicle-related information relies at least in part on the vehicle-related information that is at least partially transferred via an optical communication system 2016

↓ wherein the generating a repeatably displaceable emanating element display that may display at least part of an at least one synchronously modifiable oriented image based at least in part on alterable vehicle-related information relies at least in part on the vehicle-related information that is at least partially transferred via a cell phone communication system 2018

↓ wherein the generating a repeatably displaceable emanating element display that may display at least part of an at least one synchronously modifiable oriented image based at least in part on alterable vehicle-related information relies at least in part on the vehicle-related information that is at least partially transferred via a moving-image communication system 2020

↓ wherein the generating a repeatably displaceable emanating element display that may display at least part of an at least one synchronously modifiable oriented image based at least in part on alterable vehicle-related information relies at least in part on the vehicle-related information that is at least partially transferred via a television communication system 2022

↓ wherein the generating a repeatably displaceable emanating element display that may display at least part of an at least one synchronously modifiable oriented image based at least in part on alterable vehicle-related information relies at least in part on the vehicle-related information that is at least partially transferred via a video communication system 2024

↓ wherein the generating a repeatably displaceable emanating element display that may display at least part of an at least one synchronously modifiable oriented image based at least in part on alterable vehicle-related information relies at least in part on the vehicle-related information that is at least partially transferred via a positional information communication system 2026

| 23a |
| 23b |

FIG. 23b     Key To FIG. 23

REPEATABLY DISPLACEABLE EMANATING ELEMENT DISPLAY

TECHNICAL FIELD

Certain aspects of this disclosure can relate to, but are not limited to, certain embodiments of repeatably displaceable emanating element displays, and/or associated techniques and/or mechanisms.

BRIEF DESCRIPTION OF THE FIGURES

FIG. 23 (including FIGS. 23a and 23b) is a flow chart of another embodiment of the repeatably displaceable emanating element display technique;

DETAILED DESCRIPTION

Figure 1:
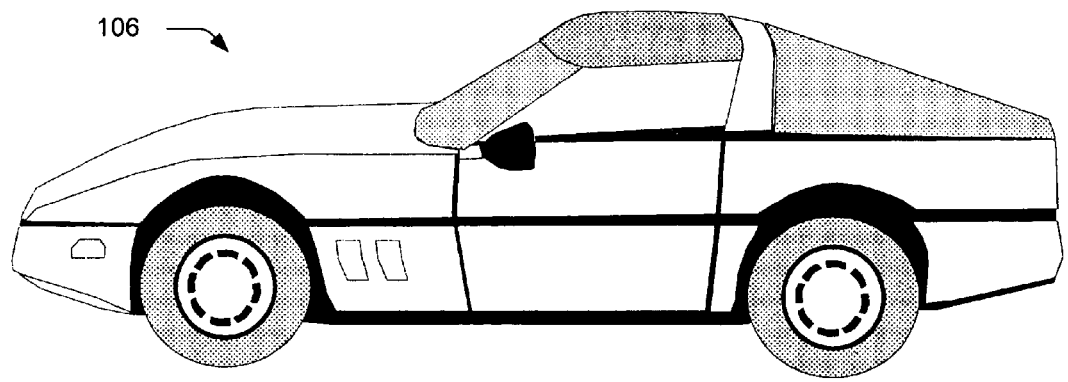
FIG. 1 is a diagram of one embodiment of a display emanating object configured to be able to provide at least one repeatably displaceable emanating element display.

At least certain portions of the text of this disclosure (e.g., claims and/or detailed description and/or drawings as set forth herein) can support various different claim groupings and/or various different applications. Although, for sake of convenience and understanding, the detailed description can include section headings that may generally track various different concepts associated with claims or general concepts contained within the disclosure, and is not intended to limit the scope of the invention as set forth by each particular claim. Support for a variety of embodiments of a repeatably displaceable emanating display, as described in the various applications or portions thereof, thereby can appear throughout the text and/or drawings at one or more locations, irrespective of the section headings.

1. CERTAIN EMBODIMENTS OF THE REPEATABLY DISPLACEABLE EMANATING ELEMENT DISPLAY

This disclosure describes a number of embodiments of the repeatably displaceable emanating element display 100 that can be operable to display at least part of an at least one synchronously modifiable oriented image(s) 102 at least partially from a display emanating object, such as a vehicle or mobile device 106, mobile robot, or mobile device. Within this disclosure, the term "vehicle" is intended to cover both vehicle(s) and/or mobile device(s). There are a variety of embodiments of the repeatably displaceable emanating element display 100 as described in this disclosure with respect to FIGS. 1 to 19, for example, that can be configured to display an image on a translatable, rotatable, movable, or otherwise repeatably displaceable member.

Certain embodiments of the vehicle or mobile device 106 is configured to receive vehicle-related information. Certain embodiments of the vehicle-related information can be received externally of the vehicle, or alternately certain vehicle-related information can be obtained from within the vehicle. The vehicle-related information can take the form of image(s), text, graphic(s), information, moving map display, display, a combination of these types of information, and/or modifications thereof. Certain embodiments of the repeatably displaceable emanating element display 100 can thereby create the synchronously modifiable oriented image(s) 102 at least partially in response to the vehicle-related information. Certain embodiments of the vehicle-related information may be relevant to the vehicle and/or its occupants, such as providing sensed information at least partially concerning the operation of the vehicle or mobile device 106, providing or sensing information as to the ownership, issuing an emergency state or instructions for an ambulance, police, rescue vehicle, etc. Certain embodiments of the vehicle or mobile device 106 that can be operable to display at least part of an at least one synchronously modifiable oriented image(s) 102 can be configured as at least a portion of the display emanating object (e.g., vehicle or mobile device 106) such as a wheel, a windshield wiper, a jet engine, a propeller, or another repeatably displaceable member that can translate, rotate, and/or otherwise displace (typically although not necessarily in a regular or repetitive fashion). Though this disclosure describes the vehicle-related information relating to the vehicle or mobile device at certain locations, it is envisioned depending on context that the vehicle-related information relating to its occupants and/or cargo could also be displayed by certain embodiments of the repeatably displaceable emanating element display 100.

Certain embodiments of the vehicle or mobile device 106 can be operable to display at least part of an at least one synchronously modifiable oriented image(s) 102. Certain embodiments of the repeatably displaceable emanating element display 100 can display the at least part of the at least one synchronously modifiable oriented image(s) 102, in a synchronized manner relative to a viewer such as to be oriented suitably or as desired with respect to the viewer. Certain embodiments of the repeatably displaceable emanating element display 100 can be configured as a displaceable, rotational, translational, movable, or otherwise repeatably displaceable piece of machinery such as, but not limited to, a fan, a compressor, a turbine, an impeller, etc. Certain embodiments of the display emanating object such as the vehicle and/or mobile device 106 can thereby be operable to display at least part of an at least one synchronously modifiable oriented image(s) 102 to a viewer from such piece(s) of equipment as a baseball bat, a ball, a hockey stick, etc. Certain embodiments of the repeatably displaceable emanating element display 100 can thereby be provided relative to a variety of the vehicle or mobile device(s) 106 based on the vehicle-related information, and thereby can be configured to provide a variety of the synchronously modifiable oriented image(s) 102 relating to the vehicle-related information, that can be configured to remain oriented such as to be displayed substantially relative to the viewer. Certain embodiments of the repeatably displaceable emanating element display 100 can be configured as an original display that could be applied to new vehicle(s) or mobile device(s) 106, or alternatively as an add-on that could be applied to "prior-owned," new, or used vehicle(s) or mobile device(s).

Certain embodiments of the synchronously modifiable oriented image(s) 102 can, depending upon context, be configured as a still image, as a motion image, and/or somewhere between (e.g., repeating still images, with each successive still image being slightly changed). Within this disclosure, the term "modifiable oriented image(s)" 102 can, depending on context, refer to an image that is provided on or by a displaceable member in which at least one axis of the display can during rotation, translation, etc. of the vehicle or mobile device 106, remain substantially parallel. Consider that with certain embodiments of the repeatably displaceable emanating element display 100, the displaceable member (on which the image is provided), as well as the displayed image itself, can translate, move, or otherwise be displaced or remain fixed.

Within this disclosure, the term "synchronously" as used in the phrase "synchronously modifiable oriented image(s)" 102 can, depending upon context, apply to alterable or adjustable displayed output based, at least in part, on input synchronizing information. Certain embodiments of the input vehicle-related information can, depending on context, include data, information, text, images, etc. such as could be used to sense a parameter, condition, event, etc. such as may or may not pertain to the operating condition of the vehicle or its occupants, the internal condition of the vehicle or its occupants, and/or the external condition of the vehicle or its occupants. For example, one such operating condition of a vehicle that may represent one type of vehicle-related information may include rotational velocity of a wheel. Certain operating condition(s) or external condition(s) may be determined directly (e.g., by sensing wheel rotational velocity directly) or indirectly (e.g., by determining centripetal force on an object or by monitoring speed of the vehicle). Another example of vehicle-related information may include information representing the content of a radio station or other music source that the user is listening to or information relating to music or other sounds emanating from the vehicle or another source. Such vehicle-related information may be related to certain ones of the synchronously modifiable oriented image(s) 102.

Within this disclosure, the term "repeatably" can, depending on context, mean certain ones of the repeatably displaceable display emanating element(s) 130 follow a rotational, translational, cyclic, periodic, angular, or other at least substantially repeating path.

Certain of the synchronously modifiable oriented image(s) 102 that corresponds to the vehicle-related information, as provided by certain embodiments of the repeatably displaceable emanating element display 100, could be configured as to be perceivable by a viewer. As such, certain embodiments of the repeatably displaceable emanating element display 100 could be unidirectional, and thereby have an orientation relative to at least one axis such as up and down relative to the viewer. Consider, for example, that for those images that are recognizable as having an orientation to be normally perceivable by viewers, the respective upper-oriented portion and the lower portion of the synchronously modifiable oriented image(s) 102 (e.g., that portion of the image that is directed generally respectively up and down) should be configured to appear to a viewer as oriented consistently respectively upwardly and downwardly. As such, with certain viewers and/or images, the image may appear abnormal if what is supposed to be displayed up is not displayed up; and what is supposed to be displayed as down is not displayed as down, etc. These orientation directionality concepts are also typically applicable to the synchronously modifiable oriented image(s) that are arranged as certain images, text, and other viewer orientation perceivable images. Text, for example, should be perceivable to the user (viewer) relative to up and down, as well as the viewers' left and right. As such, certain images should have a proper orientation as viewable to the user(s), and certain embodiments of the repeatably displaceable emanating element display 100 should be operable to display at least certain images with a suitable orientation.

Other image orientations from up and down may be somewhat more arbitrary as far as images being perceivable as normal to the user. Consider that with a moving image, the right (or left) portion of the synchronously modifiable oriented image may be directed at a variety of directions such as the viewer's right (or left), the display emanating object's right (or left), the repeatably displaceable emanating element display's 100 right (or left), or some other point of reference's right (or left), etc. Text represents an example of one type of image which is identifiable along the up/down axis, as well as the left/right axis. Certain embodiments of the repeatably displaceable emanating element display 100, such as may be provided on a vehicle or mobile device 106, may change axial orientation of left or right, as the vehicle or mobile device travels around the viewer, for example. For example, a direction that corresponds to the viewer's right (or left) of the synchronously modifiable oriented image(s) 102 may be rotated substantially horizontally by 180 degrees as the synchronously modifiable oriented image(s) 102 is moved to an opposite side of the viewer. As such, a display or image that is moved relative to the viewer (e.g., revolves or changes horizontal angular position about the viewer) will have a modified position within the actual coordinate system, but the viewer's perception of the orientation of the moved image may not change.

Such perceivability of the orientation of certain embodiments of the synchronously modifiable oriented image(s) 102 can occur even though projected from a variety of embodiments of the repeatably displaceable emanating element display 100 that may be configured to project on or from a variety of vehicle(s) or mobile device(s) 106. Consider that the synchronously modifiable oriented image(s) 102 is often, but not always, directed up and down with respect to the viewer since images would appear unusual in any other orientation (such as to provide an upside-down image). Consider that within this disclosure, the different intended viewer(s) of the vehicle or mobile device 106 may be an operator of, an occupant of, within, or outside of the vehicle or mobile device. As such, certain embodiments of the synchronously modifiable oriented image(s) 102 may have to be configured according to the desired, actual, or intended viewer. Within this disclosure, the orientation of the synchronously modifiable oriented image(s) 102 should be considered as illustrative, and more than likely will not be illustrated relative to the actual synchronously modifiable oriented image(s) 102. The orientation of the synchronously modifiable oriented image(s) 102, however, may be significant since for a display or image to be provided to a viewer or user, it is important that the display have an identifiable point of reference.

Certain embodiments of the repeatably displaceable emanating element display 100 can be provided for entertainment purposes; while certain embodiments of the repeatably displaceable emanating element display can be provided for functional purposes. Examples of vehicle-related information that can pertain to such functional synchronously modifiable oriented image(s) 102 can include, but are not limited to such activities as: alerting a user to a danger, advertising, providing news, operating the vehicle or mobile device, providing a display, etc. Certain embodiments of the repeatably displaceable emanating element display 100 displaying the vehicle-related information can be generated using movie, moving image, or video mechanisms and/or holographic projection or illumination projection techniques as described in this disclosure. Certain embodiments of the repeatably displaceable emanating element display 100 can be configured and/or designed based on such considerations as durability, toughness, impact resistance, ease of repair, expected service lifetime, etc.

Certain embodiments of the repeatably displaceable display emanating element(s) 130 included within the repeatably displaceable emanating element display 100 can be configured to be turned on and/or off as appropriate. By comparison, certain embodiments of the repeatably displaceable display emanating element(s) 130, as may be included within the repeatably displaceable emanating element display 100, can be configured such that when they are not illuminating they can have their light blocked, shielded, the power supply can be stopped, or provide destructively interfering illumination as appropriate. Certain embodiments of the repeatably displaceable emanating element display 100 can be configured to display a variety of images or movies pertaining to the vehicle-related information, such as may be customized by the user, owner, operator, or other person. As such, vehicles or other mobile devices 106 can be customized relative to one or more people, the individual desired displays of each viewer, one or more organizations or groups, etc. such that can be actuated and/or be actuated as appropriate or desired. It may even be possible to switch an unmarked vehicle or unmarked mobile device, as described with respect to FIG. 1 (i.e., the vehicle or mobile device that is not generating its respective modifiable orientated image(s) 102), to provide displays configured for a variety of purposes, such as a police vehicle or mobile device 106 as described with respect to FIG. 5, and/or a commercial vehicle or mobile device as described with respect to FIG. 6. Certain embodiments of the repeatably displaceable emanating element display 100 can be configured with a particular synchronously modifiable oriented image(s) 102 to personalize the vehicle-related information associated with particular vehicle or mobile device 106 and/or its owner, according to the particular user, use, application, function, appearance, etc. Such modification of appearance of the synchronously modifiable oriented image(s) 102 and/or the vehicle-related information, may be desirable with a rental vehicle or mobile device, a leased vehicle or mobile device, a multi-user vehicle or mobile device, a loaner vehicle or mobile device, an altered-identity vehicle or mobile device, a borrowed vehicle or mobile device, or another vehicle or mobile device whose coloring, design, or appearance may be desired to be altered by altering the vehicle-related information, for example. Certain embodiments of the repeatably displaceable emanating element display 100 can be made as difficult to reconfigure as desired, based on use, owner, operator, or other such factors. Certain vehicles or mobile devices 106 can, upon deactivation of the repeatably displaceable emanating element display 100, appear inconspicuous or typical. Upon actuation of the repeatably displaceable emanating element display 100, the vehicle or mobile device 106 can change appearance as desired based upon the modified vehicle-related information, such as, but not limited to: providing advertising, information, an identification; and/or when an emergency of other situation arises in which it is important to identify the user and/or provide an emergency alert, siren, or other indicator, etc., as described with respect to FIG. 5. Certain embodiments of the synchronously modifiable oriented image(s) 102 can upon actuation be configured to provide such emergency alert, siren, or other indicator. Certain embodiments of the repeatably displaceable emanating element display 100 relating to the vehicle-related information can be configured to provide the light for and/or the appearance of an emergency alert, a siren, or another indicator either directly and/or off some surface.

Figure 2:
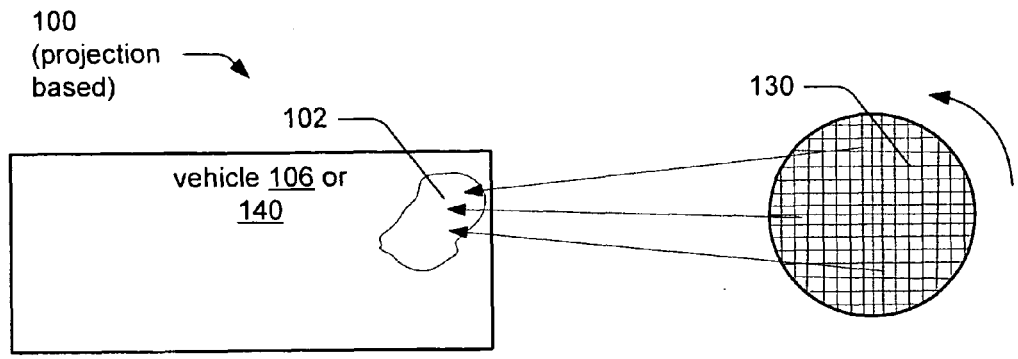
FIG. 2 is a diagram of one embodiment of the repeatably displaceable emanating element display which is configured to provide a projection type synchronously modifiable oriented image(s)

Certain embodiments of the repeatably displaceable emanating element display 100 can configure or operate their repeatably displaceable display emanating element(s) 130 to provide a projection type synchronously modifiable oriented image 102 relating to the vehicle-related information, such as to project light onto a nearby illuminated displayed region 140, such as described with respect to FIG. 2. For example, the synchronously modifiable oriented image(s) projected from hubcaps or wheels of a car, bus, or other vehicle or mobile device 106 relating to the vehicle-related information could be projected on such displayed region(s) 140 as the side, hood, front, back, or other region of the vehicle or mobile device, another vehicle or mobile device nearby the emanating vehicle or mobile device, at the wheels of the vehicle or mobile device, or at other portions of the vehicle or mobile device. Certain embodiments of the repeatably displaceable emanating element display 100 relating to the vehicle-related information that can generate holograms, as described in this disclosure, are within the intended scope of the projection repeatably displaceable emanating element display 100. Certain embodiments of the repeatably displaceable emanating element display 100 relating to the vehicle-related information can be configured to warn one or both vehicle or mobile device drivers or operators if they pass close together; or warn one vehicle or mobile device driver or operator if it passes into an undesirable, unsafe, or unexpected area such as a driver nearly driving a car off the road or into the wrong lane.

Figure 3:
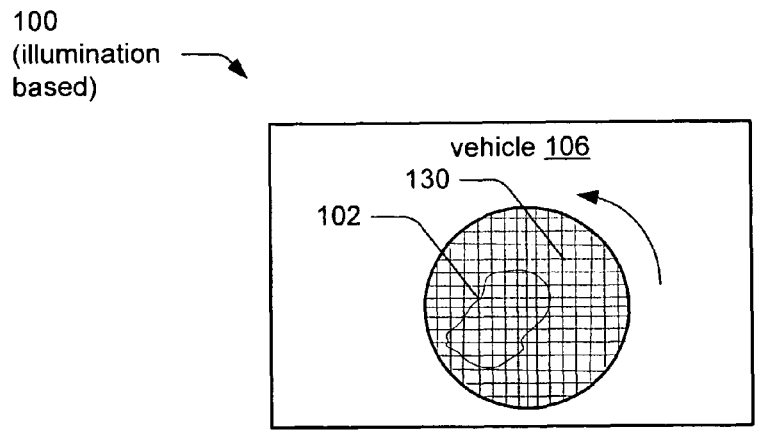
FIG. 3 is a diagram of one embodiment of the repeatably displaceable emanating element display which is configured to provide an illumination type synchronously modifiable oriented image(s)

By comparison, as illustrated in FIG. 3, certain embodiments of the repeatably displaceable emanating element display 100 relating to the vehicle-related information can provide an illumination type modifiable oriented image(s) 102. With such illumination type modifiable oriented image(s), the repeatably displaceable display emanating element(s) 130 relating to the vehicle-related information may be illuminated such that they can at least partially be viewed directly by the viewer, and the repeatably displaceable display emanating element(s) provide the modifiable oriented image that appears substantially stable to a viewer of the image.

Figure 12:
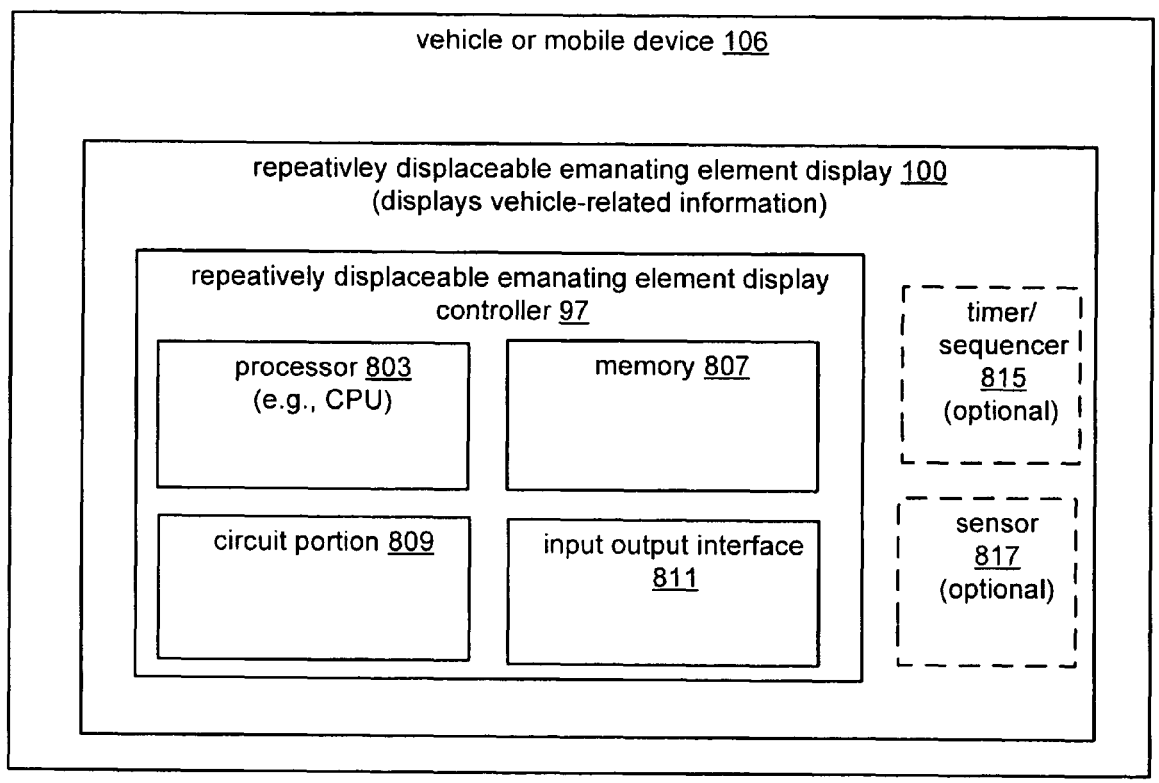
FIG. 12 is a block diagram of an embodiment of the repeatably displaceable emanating element display controller.

Certain embodiments of the repeatably displaceable emanating element display 100 relating to the vehicle-related information can be configured to be associated with computers, controllers, micro-processors, networked electronic-based devices, and/or computer-based devices as described in this disclosure with respect to FIG. 12 to perform a variety of operations. For example, certain embodiments of the repeatably displaceable emanating element display 100 relating to the vehicle-related information can be configured to sense a variety of parameters, such as temperature, proximity, position/location, velocity, acceleration, and other parameters that may or may not be associated with the operation of the vehicle or mobile device 106. Certain embodiments of the repeatably displaceable emanating element display 100 relating to the vehicle-related information can be configured to transmit and/or receive a variety of signals, data, information, etc. using a variety of networking, computer, communications, sensor or other technologies and mechanisms.

Certain embodiments of the repeatably displaceable emanating element display 100 relating to the vehicle-related information can be configured to utilize a variety of timer/sequencer mechanisms 815 that can be respectively configured to control the timing, sequencing, and directing of images created thereby as described with respect to FIG. 12. As such, certain embodiments of the modifiable oriented image(s) 102, as generated by the repeatably displaceable emanating element display 100, can be configured in the desired orientation, and produce a desired or suitable image as described in this disclosure. Certain embodiments of the timer/sequencer 815 can determine the position of the wheel, such as by determining when the wheel passes a desired point, on successive rotations, and from there determining the angular velocity. Based on the angular velocity and the determined angular position, it can be determined the duration that each repeatably displaceable display emanating element(s) should be actuated to produce the desired output pattern. Certain embodiments of the repeatably displaceable emanating element display 100 can be similarly suitably configured.

Other embodiments of the timer/sequencer 815 can utilize applying electromagnetic radiation such as, but not limited to: light, infrared, ultraviolet, other radiation, etc. to certain prescribed areas, such that the repeatable displaceable display emanating element(s) 130 passing through the radiated regions will be actuated or deactivated based at least in part on the application of the electromagnetic radiation. These configurations of synchronization as described with respect to the timer/sequencer 815 are intended to be illustrative in nature but not limiting in scope, since there could be a variety of such embodiments of the timer/sequencer 815 and associated operation(s), as would be understood to those skilled in the synchronizer and/or display technologies.

Certain embodiments of the repeatably displaceable emanating element display 100 can include a sensor 817 that can sense a variety of parameters which may or may not be related to the vehicle-related information and/or an operation of the vehicle or mobile device 106. As such, certain embodiments of the repeatably displaceable emanating element display 100 can be configured to display a variety of the vehicle-related information, which may be used for entertainment, advertising, or other non-functional purposes (as to the vehicle's or mobile device's operation) or functional purposes. By comparison, certain embodiments of the repeatably displaceable emanating element display 100 can be configured to sense such functional operating parameters, and perhaps provide some improvement in safety, hazard notification, information detection, transfer, display utility, display intensity, and/or display quality, etc.

Certain embodiments of the repeatably displaceable emanating element display 100 can be configured to provide a variety of displays utilizing a variety of display technologies that may be utilized in a variety of vehicles or mobile devices 106. For example, certain embodiments of the repeatably displaceable emanating element display 100 may be configured to provide still images, repetitive images, motion images, near real-time images, holographic images, video images, and/or other types of images, modifications of images, combinations of images, etc. as would be evident to one skilled in the display technologies upon consideration of the present disclosure, as limited by the scope of the appended claims. Certain embodiments of the repeatably displaceable emanating element display 100 can be configured or designed to apply to the projection type synchronously modifiable oriented image 102 as described with respect to FIG. 2 and/or the illumination type synchronously modifiable oriented image as described with respect to FIG. 3. Such variations of the repeatably displaceable emanating element display 100 that can display the vehicle-related information are, depending on context, intended to be within the scope of the present disclosure as set forth in at least some of the appended claims. As such, certain embodiments of the repeatably displaceable emanating element display 100 can be configured to display a wide range of the vehicle-related information, images, items, and/or displays with a variety of refresh rates, complexity, sophistication, type of vehicle, mobile device, and/or display, harshness of display application, and/or reliability.

Certain embodiments of the repeatably displaceable emanating element display 100 that can display the vehicle-related information may, thereby, be operable with certain embodiments of vehicles or mobile devices. Within this disclosure, vehicles or mobile devices can, depending on context, include human transporting, human operated, as well as autonomous-operated or robot-operated vehicles or mobile devices. Certain embodiments of the vehicles or mobile devices that can include and utilize the operation of a variety of vehicle or mobile device 106 can include, but are not limited to, cars, trucks, trains, busses, boats, motorcycles, racecars, scooters, motor homes, recreational vehicles or mobile devices, airplanes, helicopters, blimps, bicycles, drones (sea, land, or air-based, robot vehicles or mobile devices) etc., and various combinations or modifications thereof. While certain embodiments of the vehicle or mobile device 106 can be applied to a variety of vehicles or mobile devices as described in this disclosure, these particular applications are intended to be illustrative in nature but not limiting in scope. Those skilled in the display art would recognize the variety of technologies and vehicles or mobile devices to which certain embodiments of the repeatably displaceable emanating element display 100 may be applied.

Certain embodiments of the repeatably displaceable emanating element display 100 may be used for such entertainment purposes as, but not limited to, providing varied displays that can be identifiable with such varied aspects as music groups, sports teams, advertisement, group, associations, etc. Certain embodiments of the repeatably displaceable emanating element display 100 can display the synchronously modifiable oriented image 102 relating to the vehicle-related information, or other desirable information, on the wheels, hubcaps, sides, or other portions of the vehicle or mobile device 106. Consider, for example, certain embodiments of the repeatably displaceable emanating element display 100 display vehicle-related information which may be associated with another system (e.g., music system, etc.), such as to provide entertainment information about the vehicle or mobile device 106.

Certain embodiments of the repeatably displaceable emanating element display 100 that may be used to display functional vehicle-related information may be for providing varied displays containing a variety of information or data such as emergency information, other desirable information locational/positioning indicating information, velocity-related information, and/or temperature-related display information for the display emanating object.

Certain embodiments of the repeatably displaceable emanating element display 100 can be used to display synchronously modifiable oriented image(s) 102 for a variety of applications, as described in this disclosure, including but not limited to entertainment, emergency, advertising, identification, or other functional or non-functional purposes, and is not intended to be limiting in scope. For instance, certain embodiments of the repeatably displaceable emanating element display 100 that are configured to operate with certain embodiments of the vehicle or mobile device 106 can act, for example, to identify an emergency vehicle or mobile device, a military vehicle or mobile device, a commercial vehicle or mobile device, etc. Various embodiments of the repeatably displaceable emanating element display 100 can operate and/or be structured very similarly, regardless of display context. For example, certain embodiments of the repeatably displaceable emanating element display 100 can operate similarly whether they are being used relative to some functional or non-functional vehicle-related information, such as to identify an individual as a fan of a particular band, an emergency vehicle, or to provide some operational parameters to the vehicle's operator, and they may be viewed as providing graphics, information, data, text, etc. during operation.

This disclosure thereby describes a number of embodiments and aspects of, the repeatably displaceable emanating element display 100 that can be configured to display at least a portion of the at least one synchronously modifiable oriented image(s) 102 relating to the vehicle-related information. Certain embodiments of the repeatably displaceable emanating element display 100, as described with respect to FIGS. 1 to 19, and at other locations throughout the disclosure, can be configured to display the at least one (and perhaps a number of) synchronously modifiable oriented image(s) 102 thereupon.

Certain embodiments of the at least one synchronously modifiable oriented image(s) 102 can be configured as a projection-based device as described with respect to FIG. 2, and/or as an illumination-based device as described with respect to FIG. 3. Certain embodiments of the repeatably displaceable emanating element display 100 can be configured to emanate the at least one synchronously modifiable oriented image(s) 102 from a rotational and/or translatory source relative to the vehicle or mobile device 106.

Certain embodiments of the repeatably displaceable emanating element display 100 can be configured and/or customized to display a variety of vehicle-related information, such as described with respect to FIGS. 1, 5, 6, 10, and other locations, as desired by the user and/or based on the utility of the vehicle or mobile device. For example, an ambulance or other vehicle is likely to be configured differently from a commercial vehicle with advertising. Instead of vehicles or mobile devices and the like having to be colored, stylized in a manner that is difficult to change, certain owners and/or operators may desire to use certain embodiments of the repeatably displaceable emanating element display 100 which can be configured to allow a considerable variety of customization, coloring, and/or images to be provided on the vehicle or mobile device relating to a variety of respective vehicle-related information. Consider, for example, that certain embodiments of the vehicle or mobile device 106, such as wheels on vehicles or other mobile devices, can be configured not to provide a repeatably displaceable emanating element display 100, or alternately one or a variety of repeatably displaceable emanating element display(s).

Figure 10:
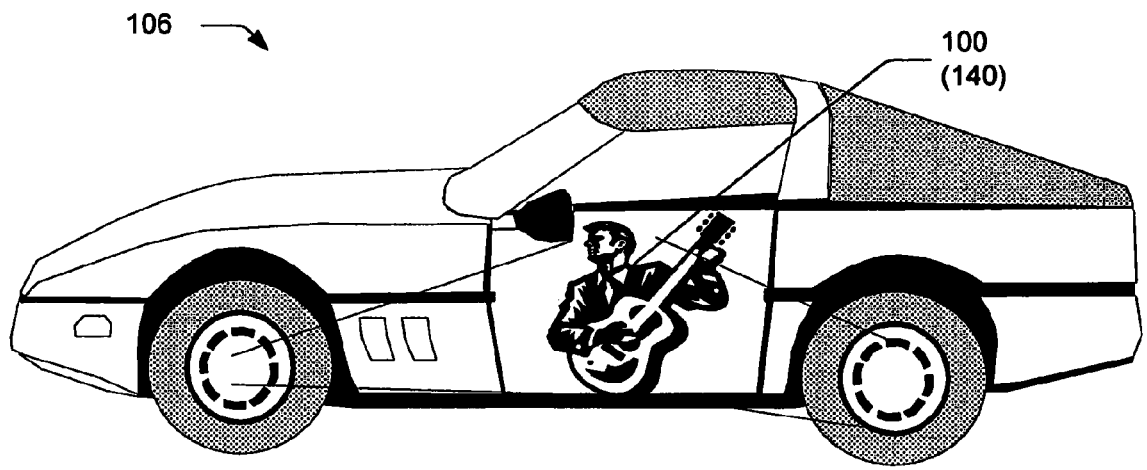
FIG. 10 is a diagram of the display emanating object of FIG. 1 displaying still another embodiment of the repeatably displaceable emanating element display.

In FIG. 1, for example, illustrates the vehicle or mobile device that can include certain embodiments of the repeatably displaceable emanating element display 100 having a number of deactivated display emanating objects (not shown) which may, prior to actuation, appear as no display or the normal vehicle or mobile device having no outwardly projected or eliminated images relating to a variety of respective vehicle-related information. By comparison, upon actuation of certain embodiments of the repeatably displaceable emanating element display 100, as described in this disclosure, the vehicle or mobile device can be transformed to provide the selected synchronously modifiable oriented image(s) 102, such as an emergency or otherwise identified vehicle or mobile device as described with respect to FIG. 5, or alternately a commercial vehicle or mobile device (e.g., a pizza delivery car) as described with respect to FIG. 6. FIG. 10 illustrates another embodiment of the vehicle or mobile device being transformed to display a moving image (e.g., music, news, sports, advertising, etc.); in this instance, a music video can be displayed on a portion of the vehicle or mobile device, and in certain embodiments the video can be temporally associated with audio and/or music associated therewith. Audio associated and/or synchronized with music videos or other images can be provided using, for example, the vehicle's sound system, or separate audio operatively associated with the repeatably displaceable emanating element display 100. These examples of the types of repeatably displaceable emanating element display 100 that can display the synchronously modifiable oriented image(s) 102 which may be perceived by the viewer are intended to be illustrative in nature, but not limiting in scope.

Certain owners of vehicles or mobile devices may be identified in their vehicles (or have their vehicles identified) according to vehicle-related information, such as their particular groups, associations, bands, types of music, etc., as a result of the repeatably displaceable emanating element display 100 displayed on their type of customized vehicles or mobile devices. Such customizing of certain embodiments of the repeatably displaceable emanating element display 100 (e.g., as emergency or commercial vehicles or mobile devices, etc.), is intended to be illustrative nature, but not limiting in scope. A considerable variety of customizing, advertising, identification, and other embodiments of the repeatably displaceable emanating element display 100 is intended to be within the scope of the present disclosure.

Figure 20:
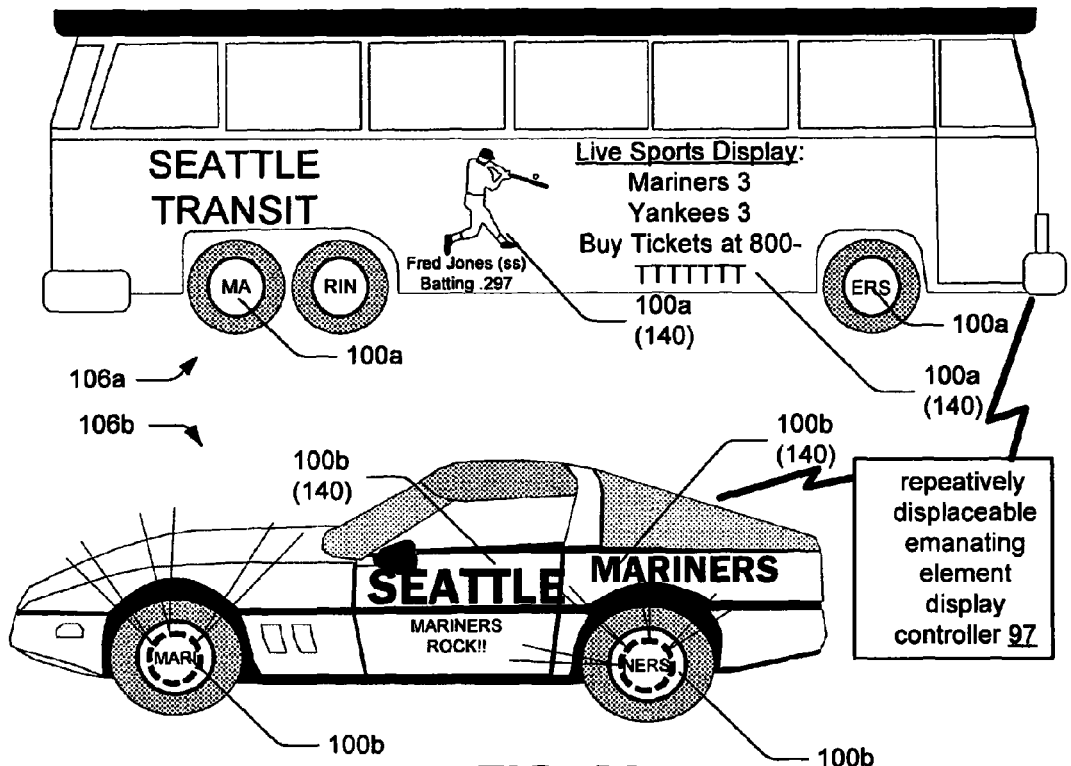
FIG. 20 is a view of still another embodiment of the repeatably displaceable emanating element display.

A respective number of the repeatably displaceable emanating element display 100 can be configured according to the vehicle-related information, such as associated with a respective number of the vehicle or mobile device 106, such as described with respect to FIG. 20, in a manner that the respective repeatably displaceable emanating element displays 100 or the respective occupants of the respective vehicles can be somehow associated with each other. For example, two vehicles or moving devices 106a and 106b can each include their respective repeatably displaceable emanating element display 100, which may each be associated with each other in some manner such as being members of a club, appreciating similar music, being supporters of the similar group, being affiliated with a similar group (e.g., police, fire, rental vehicles, etc.), having the vehicles owned by the same person or group, etc. As such, certain repeatably displaceable emanating element displays 100 could display their synchronously modifiable oriented image(s) 102 based at least in part, on similar vehicle-related information with respect to each other. As such, certain vehicles or mobile device(s) 106 could display certain vehicle-related information as image(s), text, etc. as determined from at least one of the vehicle or moving device, or alternately from some other location (e.g., a centralized networking location) as generally understood. With certain embodiments of the vehicle(s) or moving device(s) 106, however, the owner or operator of the vehicle or moving device could select to not display, or override the selection of the vehicle-related information relating to the synchronously modifiable oriented image(s) 102. As such, each person who is associated with certain embodiments of the vehicle(s) or mobile device(s) 106 may opt not to display the synchronously modifiable oriented image(s) 102 that has been selected or synchronized to be displayed on their vehicle(s) or mobile device(s) 106. As such, certain embodiments of the respective repeatably displaceable emanating element displays 100 that may be associated with respective vehicle(s) or mobile device(s) 106, as described in this disclosure, may be configured to operate similar as networked (computer, controller, etc.) devices in selecting their vehicle-related information relating to their respective synchronously modifiable oriented image(s) 102 to display. The information displayed by each of the repeatably displaceable emanating element displays 100 that is associated need not be identical information to be associated with information from other repeatably displaceable emanating element displays 100. In some cases, information displayed by a first of the repeatably displaceable emanating element displays 100 may combine with information displayed by one or more others of the repeatably displaceable emanating element displays 100 to form a composite image, such as respective portions of an overall image.

Figure 21:
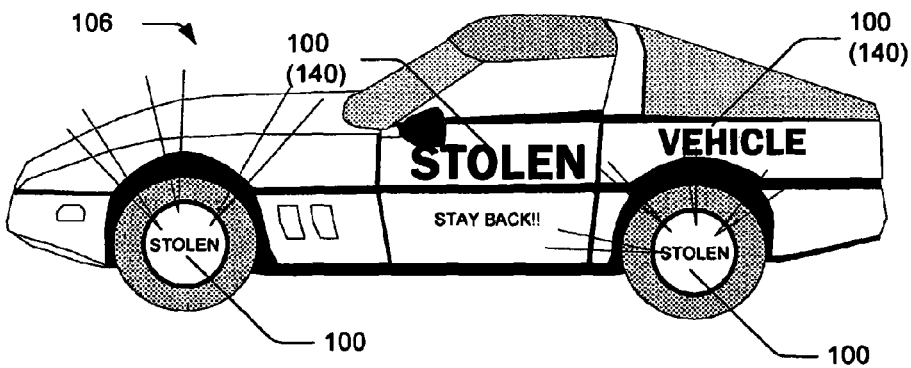
FIG. 21 is a view of another embodiment of the repeatably displaceable emanating element display.

Certain embodiments of the repeatably displaceable emanating element display 100 could illustrate certain characteristics or information related to the vehicle or mobile device as described with respect to FIG. 21. For instance, if a particular vehicle is associated with a robbery, the repeatably displaceable emanating element display 100 of the car itself could be configured based at least in part on the vehicle-related information to illustrate "dangerous felon", "stolen vehicle", "this vehicle is being driven recklessly", or something else suitable. As such, if the vehicle is temporarily lost in a chase, etc., then the vehicle could be easily identified. Certain embodiments of the repeatably displaceable emanating element display 100 could thereby be actuated remotely in emergency or other situations using known and/or commercially available networking techniques, such as by a police car or by an owner of a stolen car. If a particular vehicle is stolen, certain embodiments of the repeatably displaceable emanating element display 100 can be synchronized to display vehicle-related information to display a "stolen vehicle" indicator. The possibility that stolen vehicles can be easily identified may thereby considerably reduce the number of stolen vehicles. Additionally, it would be less likely that certain ones of such stolen vehicles could be re-sold if indicated as stolen; if the "prospective purchasers" could easily identify the such cars as having been stolen.

Figure 5:
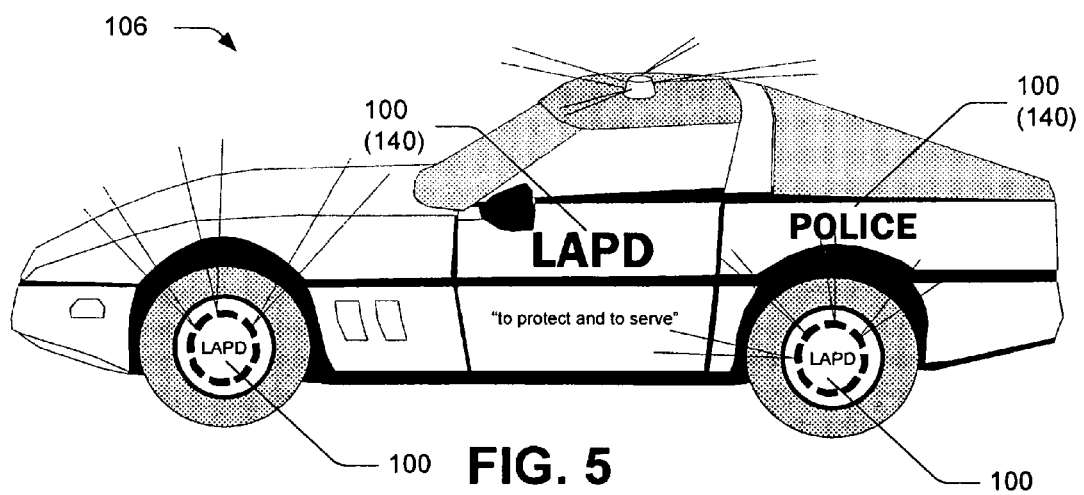
FIG. 5 is a diagram of the display emanating object of FIG. 1 displaying one embodiment of the repeatably displaceable emanating element display.
Figure 6:
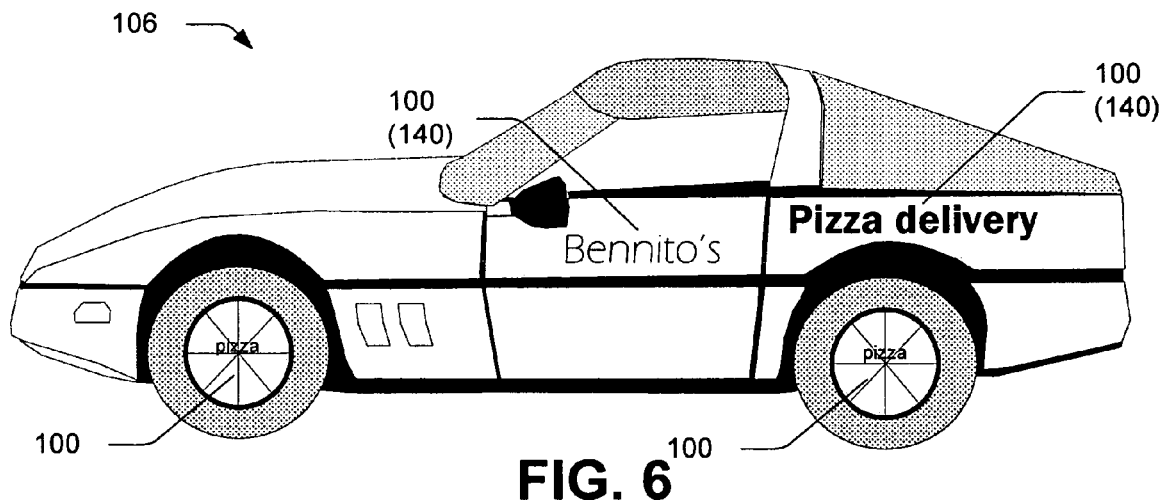
FIG. 6 is a diagram of the display emanating object of FIG. 1 displaying another embodiment of the repeatably displaceable emanating element display.

Certain embodiments of the repeatably displaceable emanating element display 100, such as illustrated in FIGS. 5, 6, and 10, might be projection-based, and thereby at least partially project its synchronously modifiable oriented image(s) 102 on a stationary or other surface of the vehicle or mobile device, as described with respect to FIG. 2. Certain of the projection-based embodiments of the repeatably displaceable emanating element display 100, as described with respect to FIG. 2, might be expected to project its synchronously modifiable oriented image(s) 102 from the displaceable surface of the vehicle or mobile device (such as a hubcap, a wheel, a tire, a windshield wiper, etc., as described with respect to FIG. 7, 8, 9, and/or 10). Within this disclosure, the term "repeatably displaceable" as included in the term "repeatably displaceable emanating element display 100" which can display a variety of the vehicle-related information can mean, depending on context, moving in some manner, typically at least partially repeating, such that by the movement providing a pattern by the illumination of at least parts of the repeatably displaceable emanating element display(s), during its repeating motion, as can be done using certain embodiments of the timer/sequencer 815 as described with respect to FIG. 12, can have the effect of modifying the images, text, colors, positions, etc. as associated with the synchronously modifiable oriented image(s) 102 that can be projected by certain embodiments of the repeatably displaceable emanating element display 100.

Figure 7:
FIG. 7 is an expanded view of one repeatably displaceable emanating element display of FIG. 6.
Figure 8:
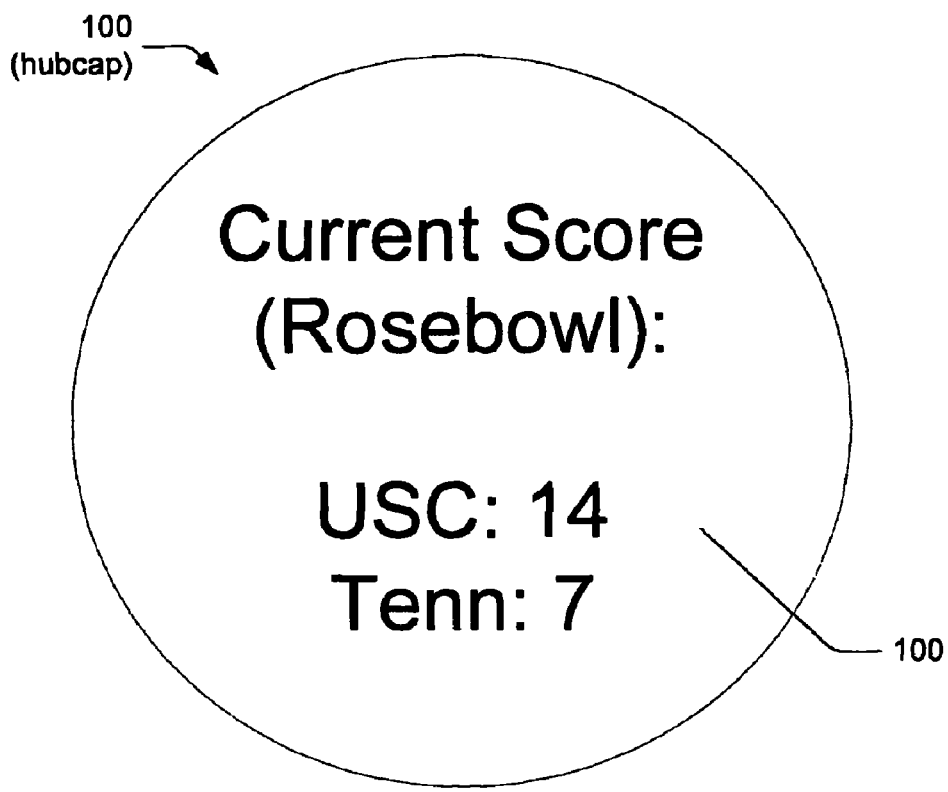
FIG. 8 is a view of another embodiment of repeatably displaceable emanating element display.
Figure 9:
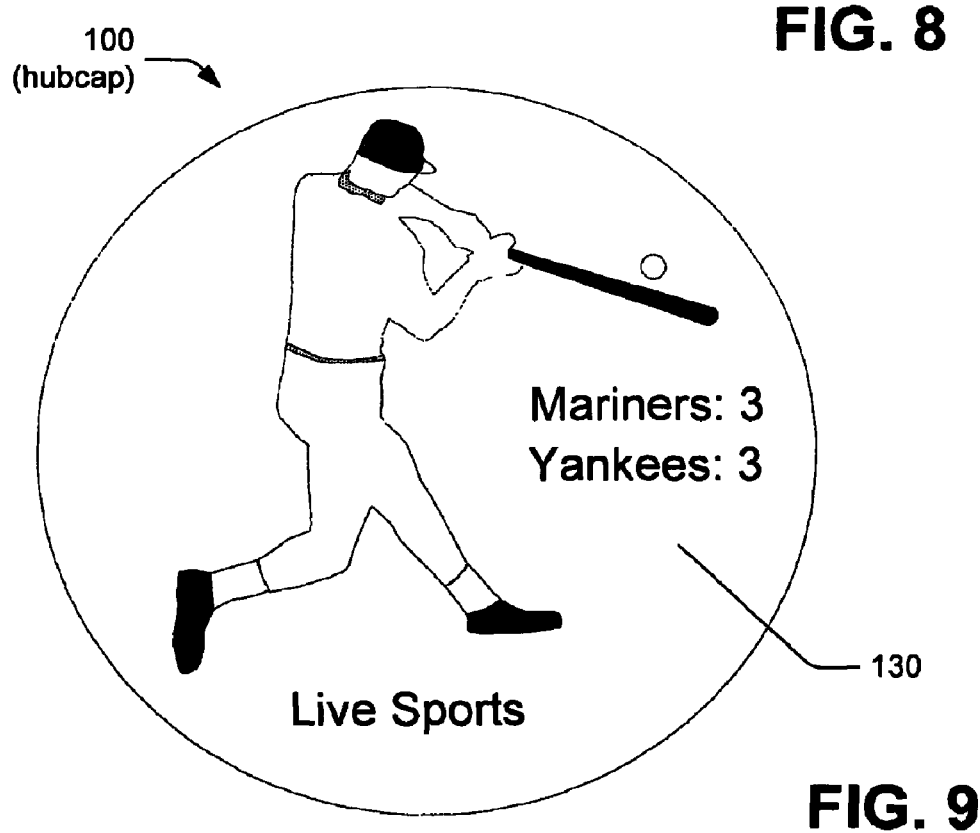
FIG. 9 is a view of yet another embodiment of repeatably displaceable emanating element display.

Certain embodiments of the repeatably displaceable emanating element display 100, such as illustrated in FIGS. 5, 6, and 10, might be illumination-based, and thereby at least partially illuminate its synchronously modifiable oriented image(s) 102, as described with respect to FIG. 3. Certain of the illumination-based embodiments of the repeatably displaceable emanating element display 100, as described with respect to FIG. 3, might be expected to project its synchronously modifiable oriented image(s) 102 from the displaceable surface of the vehicle or mobile device such as wheels, tires, windshield wipers, etc., as illustrated in FIG. 7, 8, 9, and/or 10.

A variety of certain embodiments of the projection-based synchronously modifiable oriented image(s) 102, as described with respect to FIG. 2; as well as the illumination-based synchronously modifiable oriented image(s) 102, as described with respect to FIG. 3, can each provide a variety of the vehicle-related information corresponding to the synchronously modifiable oriented image(s) 102, which can include but are not limited to, the repeatably displaceable emanating element(s) 130 still images, motion images, or a variety or combination thereof.

Figure 4:
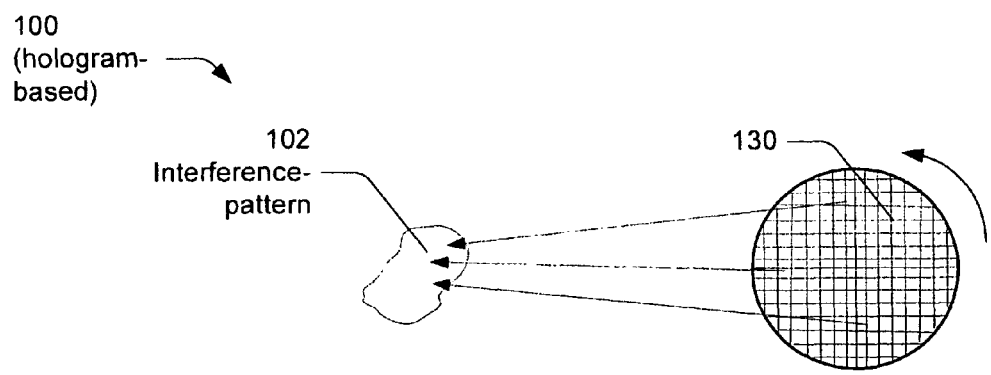
FIG. 4 is a diagram of one embodiment of the repeatably displaceable emanating element display which is configured to provide a hologram type synchronously modifiable orient image(s)

Certain embodiments of the repeatably displaceable emanating element display 100 can utilize holographic projection techniques as described with respect to FIG. 4, such as to project holographic synchronously modifiable oriented image(s) and/or video-graphic synchronously modifiable oriented image(s). It is envisioned that a variety of embodiments of repeatably displaceable emanating element display 100 can be provided using holograms. Certain embodiments of the repeatably displaceable emanating element display 100 can be configured with holograms, that can be generated utilizing interference between light that may be provided from different locations and/or sources. Certain embodiments of holograms can involve interference between either coherent light sources (such as may be provided from lasers or certain LEDs), or incoherent light sources. As such, the holographic image as provided by certain embodiments of the repeatably displaceable emanating element display may appear to one or more viewers at a location separate than the source, and such selection of location to project the hologram display may be based at least in part on desired functionality of the display. For example, if a vehicle's or mobile device's operation is directed within a specific area during operation, it may be desired to project the hologram embodiment of the repeatably displaceable emanating element display 100 to nearby that area. Certain hologram embodiments of the repeatably displaceable emanating element display 100 may be configured to be displayed in one, two, or three dimensions.

Certain hologram-based, projection-based, and/or illumination-based embodiments (as well as other embodiments) of the repeatably displaceable emanating element display 100 may be configured to provide a display that may be viewed without completely obstructing the background. For example, certain embodiments of the repeatably displaceable emanating element display 100 may rely on a moving member such as propellers, turbines, spokes of wheels, etc. that obstructs the background for only a portion of the cycle. Since certain embodiments of the repeatably displaceable emanating element display 100 may thereby project light at certain repeatably displaceable emanating element(s) 130 and/or obstructs the background only during portions of each repetitive cycle; during the remainder of the cycle in which the background may not be obstructed the illumination from the background may provide the unobstructed illumination at that area during certain times. Consider that if a rotating propeller, fan, turbine, spokes of wheels, etc. is rotating through an area, it is likely that the viewer(s) will be able to see partially-through the area which the propeller is rotating. Alternatively, certain embodiments of the repeatably displaceable emanating element display 100 can be configured to provide, corresponding to the vehicle-related information an illumination and/or hologram, etc. that is sufficiently bright to be seen, but not overly bright as to obstruct the background.

Certain embodiments of the repeatably displaceable emanating element display 100 could be either at least partially user-controlled and/or at least partially automatically controlled, such as to be able to generate the intensity of light being generated there from relative to ambient light, viewpoint(s) of the viewer(s), etc. As such, one or more vehicle-related information as provided by certain embodiments of the repeatably displaceable emanating element display 100 can be customized to its intended usage, function, design, etc. either manually, automatically, or in-between.

Certain embodiments of the repeatably displaceable emanating element display 100 can utilize a timing and/or sequencing mechanism to control when certain of the repeatably displaceable display emanating element(s) 130 may be actuated (such as by using the timer/sequencer 815 as described with respect to FIG. 12). Certain embodiments of the repeatably displaceable emanating element display 100 such as a hubcap, wheel, propeller, turbine, etc. for instance, can therefore provide the synchronously modifiable oriented image(s) 102 relating to the vehicle-related information that can be orientation stabilized to accommodate the rotation of the displaceable device relative to the viewer as the portion of the vehicle on which the display is provided rotates or otherwise is displaced. A velocity or orientation detector can be provided, such as may be associated with the timer/sequencer 815 and/or the sensor 817 of FIG. 12, to know when or how to actuate the repeatably displaceable emanating element display 100. There may be a number of viewers of certain embodiments of the repeatably displaceable emanating element display 100 that are situated at a variety of locations, and as such certain embodiments of the repeatably displaceable emanating element display may be configured to provide displays to a variety of locations such as within various positional or angular ranges.

It would also be possible to have certain embodiments of the synchronously modifiable oriented image 102 projected from within the vehicle or mobile device 106 (e.g., from a wheel hubcap onto a side of the vehicle or mobile device, or onto the wheel or hubcap) in which the repeatably displaceable display emanating element(s) 130 as described with respect to FIG. 2 and/or 3 may be actuated in some kind of cyclical fashion such as to synchronize to display to maintain it's desired orientation. It would also be possible to project certain embodiments of the synchronously modifiable oriented image(s) 102 from multiple positions and/or angles onto one or more sides of the vehicle or mobile device from one or more vehicle or mobile device 106 such as to create, e.g., overlapping images, etc. Certain embodiments of the synchronously modifiable oriented image(s) could be configured as either a holographic projection or a video-graphic projection (which may be projection-based or illumination-based). It may thereby be possible to project video or holographic versions of the synchronously modifiable oriented image(s), potentially even with sound or music added such as to create a music/video experience on to a prescribed region, such as sides, top, front, back, etc. of the vehicle or mobile device.

Figure 11:
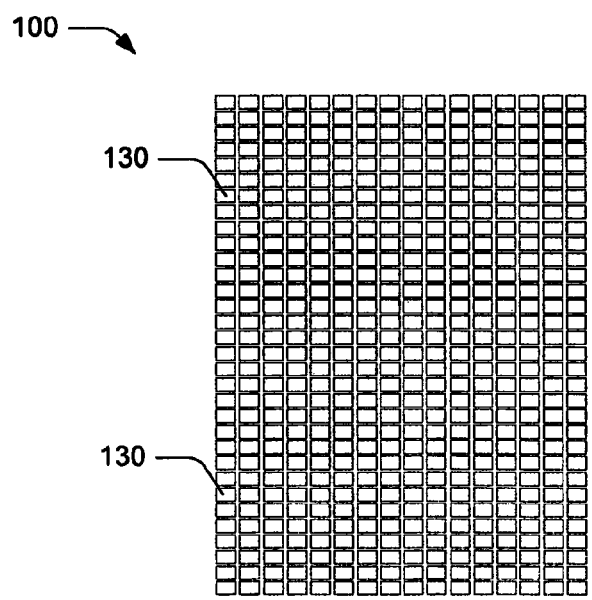
FIG. 11 is a structural diagram of another embodiment of the repeatably displaceable emanating element display.

Certain embodiments of the vehicle or mobile device 106, such as a wheel or hubcap, can be covered with an array of repeatably displaceable display emanating element(s) 130 as described with respect to FIGS. 2, 3, and 11, that can be used to provide the synchronously modifiable oriented image, as described with respect to FIGS. 1 to 19. Certain embodiments of the repeatably displaceable display emanating element(s) 130 can currently be situated at a variety of locations relative to the display emanating object such as the wheel or hubcap of the vehicle or mobile device, and may be configured either monochromatically or in as wide variety of colors as desirable or technically feasible. Certain embodiments of the repeatably displaceable emanating element display 100 can be provided or situated over a variety of objects including a vehicle at least partially using LED elements is as illustrated in the web page: http://www.litewave.co.uk/, (incorporated herein by reference). A description of the wide variety of applications of LEDs as well as their operating characteristics and structures is included in the article: Light Emitting Diodes (LEDs) for General Illumination, An OIDA Technology Roadmap Update 2002 located at http://www.oida.org (incorporated herein by reference). A variety of LEDs, LCDs, and other repeatably displaceable display emanating element(s) 130 such as may be provided for a variety of the repeatably displaceable emanating element display 100, are commercially available from numerous vendors. The design and use of LEDs is generally known to those skilled in the display and/or illumination areas, and will not be further described herein. Other suitable illumination and/or display devices, such as light emitting diodes (LEDs) could also be applied to certain embodiments of the repeatably displaceable display emanating element(s) 130 and/or certain embodiments of the repeatably displaceable emanating element display 100.

As described in this disclosure, there may be a variety of projection, illumination, or holographic techniques for displaying the vehicle-related information using the repeatably displaceable emanating element display 100 as described in this disclosure. For example, certain embodiments of the repeatably displaceable emanating element display 100 can thereby display a holographic, illumination, or projection version of the repeatably displaceable emanating element display 100 to display at least one synchronously modifiable oriented image(s) 102 on a variety of the display emanating objects such as vehicles 106 (e.g., cars, trucks, trains, motorcycles, bicycles, boats, aircraft, etc). Although certain embodiments of the repeatably displaceable display emanating element(s) 130 may be presented here as one way of achieving a multi-spectral light source, other light sources may be desired depending on the application.

A variety of embodiments of the repeatably displaceable emanating element display 100 can be used for entertainment purposes. Consider that a variety of markings, decorations, and/or coloring are already popular for a variety of vehicles or mobile devices such as cars, boats, trucks, trains, airplanes, helicopters, etc. Certain embodiments of the repeatably displaceable emanating element display 100 can be configured to project the holographic, projected, illumination, video, or other synchronously modifiable oriented image(s) 102 which may be either static or moving. Certain embodiments of the repeatably displaceable emanating element display 100 can utilize a variety of technology as applied to the repeatably displaceable display emanating element(s) 130: liquid crystal display (LCD) device(s), light emitting device (LED) device(s), or other suitable device(s) can be configured to generate the light that can be projected as the synchronously modifiable oriented image(s). As such, owners, operators, designers, etc. of the vehicle or mobile device can change the appearance, color, or design of their vehicle or mobile device as they desire, or based on function or operation of the vehicle or mobile device.

Certain embodiments of the synchronously modifiable oriented image can be projected as a displaceable or stationary portion of the vehicle or mobile device 106 such as the moving vehicle or mobile device. Certain embodiments of the repeatably displaceable emanating element display 100 can utilize technology that can be used to turn the at least one synchronously modifiable oriented image(s) 102 on and/or off at any sufficient rate to provide a quality image corresponding to the vehicle-related information on the display emanating object, such as the vehicle or mobile device 106 as may utilize the timer/sequencer 815 as described with respect to FIG. 12. Certain embodiments of the at least one synchronously modifiable oriented image(s) 102 can be projected on a non-displaceable portion of the vehicle or mobile device 106 (e.g., a side, a door, a hood, etc.).

Certain embodiments of the at least one synchronously modifiable oriented image(s) 102 can be projected on a displaceable portion of the display emanating object such as the vehicle or mobile device (e.g., a wheel, a hubcap, a propeller for an airplane or helicopter). Certain embodiments of the repeatably displaceable emanating element display 100 can, for instance, be projected from a portion of the display emanating object such as the vehicle or mobile device that rotates (e.g., spins around), therefore a repeating tire, propeller, wheel, rotating device, translating device, and/or other movable device that can be configured to project, illuminate, or otherwise create the synchronously modifiable oriented image(s) 102 which can be projected using this rotation by turning the repeatably displaceable display emanating element(s) 130 (e.g., using LED, LCD, or other suitable display technologies) on at the appropriate rate that the projected light contributes to the desired projected synchronously modifiable oriented image(s) 102. As such, certain suitable repeatably displaceable display emanating element(s) 130 can be turned off at the appropriate time and/or location such that the projected light does not contribute to the desired projected synchronously modifiable oriented image(s) as relating to the vehicle-related information.

It can also be possible with certain embodiments of the repeatably displaceable emanating element display 100 to have the synchronously modifiable oriented image(s) 102 projected from such vehicle or mobile device 106 relating to the vehicle-related information, as within the hubcap, onto a non-rotational illumination displayed region 140 such as the portion of the vehicle or mobile device as described with respect to FIG. 2, or onto the hubcap in some kind of cyclical fashion. Certain embodiments of the repeatably displaceable emanating element display 100 can also project from multiple positions or angles onto a portion of the vehicle or mobile device or other vehicle or mobile device 106 as relating to the vehicle-related information. Certain embodiments of the at least one synchronously modifiable oriented image(s) 102 could be highly personalized, such as to project short video or holographic clips, potentially even with sound or music added, onto the sides of the car.

Certain embodiments of the repeatably displaceable emanating element display 100 could project the at least one synchronously modifiable oriented image(s) 102 configured as a holographic projection, a moving-image projection, an illuminated-image, and/or a video-graphic projection. There can be a wide variety of information, data, images, maps, text, etc. that can be provided using certain embodiments of the repeatably displaceable emanating element display 100 as applied to aircraft, as described with respect to FIGS. 13 to 17. While these repeatably displaceable emanating element display are described with respect to aircraft propellers and/or jet engines, it is envisioned that at least certain similar embodiments of the repeatably displaceable emanating element display 100 can be applied to other embodiments of vehicles or mobile devices such as, but not limited to, cars, boats, trucks, trains, submarines, bicycles, etc. For instance, the moving map GPS display as described with respect to the aircraft propeller of FIG. 16 can be applied as a moving map GPS in an automobile, truck, ship, bus, etc. such as are generally known and commercially available It may be desired to "project" illumination from a location of the at least one repeatably displaceable emanating element display(s) 100 to another location, such as described with respect to FIGS. 4 and 17 using holographic images. Consider, for example, a twin aircraft with an engine (propeller or jet) mounted on each wing and/or on the fuselage. The propeller for one or more of the engine(s) could include certain embodiments of the repeatably displaceable emanating element display 100 whose respective light can constructively interfere, such as can provide holograms. Holograms and/or holographic images can be created at least partially by interference between light from multiple sources (or one light source having light taking different paths) such as may be located on multiple, or even a single, propeller or light source. As such, certain embodiments of the repeatably displaceable emanating element display 100 that could be configured as a twin aircraft could, for example, project light and/or images to a location distant from the propellers, such as in front of the windshield, within the cockpit, etc. Certain embodiments of the holographic or other projecting embodiments of the repeatably displaceable emanating element display 100 can be configured to provide such information as may be desired to display such as vehicle operational information, GPS information, positional information, moving map information, unrelated information, etc.

Certain embodiments of the repeatably displaceable emanating element display 100 can include certain propellers (or other repeatably displaceable member) that can change their configuration such as pitch during operation. For example, certain propellers are operable to alter their pitch during operation, such as when transmitting from climb to cruise. Certain propellers can be operated at different velocities at different times. Certain aspects of synchronizing the repeatably displaceable emanating element display 100 can thereby include adjusting the repeatably displaceable display emanating element(s) 130 such as to compensate for the varied angle (pitch) of the propeller blade, thereby assuming that the illuminated, projected, holographic, or other synchronously modifiable oriented image(s) 102 are directed as desired.

Certain embodiments of the repeatably displaceable emanating element display 100 may be configured to provide synthetic vision for operators of vehicles. Certain embodiments of synthetic vision can involve synthetically generating a location of a runway or mountain for an aircraft, synthetically generating a roadway for a car, truck, or other land vehicle, synthetically generating a shoreline or channel for a boat or ship, etc. Certain types of synthetic vision can rely on an inertial navigation unit (including software and/or hardware) that can determine position, bearing, and/or velocities of the vehicle. Based on the position, etc., the display of the runway, roadway, geographic outlines, rivers, oceans, lakes, cities, etc. can be provided synthetically in an orientation that may be appropriate for and/or selected by the user of the vehicle. The geographic outline, outline of airports, roadways, channels, etc. at least partially corresponding to the vehicle-related information can be derived at least partially based on stored data of databases. One example of synthetic vision for aircraft, for example, is illustrated in the article: Synthetic Vision in the Cockpit: 3D Systems for General Aviation, Hansen et al., (incorporated herein by reference in its entirety). Certain embodiments of the repeatably displaceable emanating element display 100, as described in this disclosure, can utilize the vehicle-related information to generate a synthetic vision in a similar manner as that could be provided to the operator of the vehicle to display the relative location (often in three dimensions) of airports, roadways, etc. Synthetic vision, GPS, and other positional display devices (such as may now be provided by certain embodiments of the repeatably displaceable emanating element display 100) are generally understood by those skilled in the display technologies, and certain types or versions of both are commercially available from a variety of vendors, including, among others, Honeywell, Garmin International, Inc.

Certain embodiments of the repeatably displaceable emanating element display 100 could be configured to alert operators of vehicles such as cars or trucks as to other vehicles or other objects, persons, or animals that are in dangerously close proximity to the vehicle. Consider, for example, a driver of a car being alerted as to another vehicle in the adjacent lane that is close to the car, such as may be determined by certain embodiments of the sensor 817 as described with respect to FIG. 12. Certain embodiments of the repeatably displaceable emanating element display 100 can provide a hologram, illumination, or projection versions of the synchronously modifiable oriented image(s) 102 relating to the other vehicle. Certain embodiments of the repeatably displaceable emanating element display 100 can utilize synthetic vision as being applied to the roadway behind a vehicle that has limited visibility in at least one direction, such as a tractor trailer, car, truck, ships, aircraft, tractors, etc., such that the obstructed view relative to the vehicle can be provided to the repeatably displaceable emanating element display 100 situated relative to the driver, occupant, etc. Certain embodiments of the repeatably displaceable emanating element display 100 can thereby limit vehicular blind spots by either providing an image of that blind spot, or providing information relating to the blind spot. Similarly, aircraft, boats, etc. can be provided synchronized views of objects or vehicles situated within regions they cannot readily see, such as a pilot landing an aircraft at a high angle of attack can view the runway, or objects below themselves within certain of the synchronously modifiable oriented image(s) 102; or operators of large boats, ships, or trucks can view obstructed view regions, by providing certain embodiments of the synchronously modifiable oriented image(s) 102. Certain of the concepts described herein relative to aircraft, automobiles, etc. can also be applied to other vehicles such as ships, boats, railroads, hovercraft, etc.

A car driver could be warned if they are driving too close to the edge of a road, or a cliff, etc. based on displayed output of the synchronously modifiable oriented image(s) 102 from the certain embodiments of the repeatably displaceable emanating element display 100 which can rely on, e.g., GPS augmented vehicle-related information. An operator of a submarine could have a holographic or other repeatably displaceable emanating element display 100 provided as to the sensed environment outside the submarine using the synchronously modifiable oriented image(s) 102 corresponding to the vehicle-related information. These examples of the repeatably displaceable emanating element display 100 displaying a variety of synchronously modifiable oriented image(s) 102 corresponding to the vehicle-related information are intended to be illustrative in nature, but not limiting in scope. In certain instances, certain repeatably displaceable emanating element displays 100 can be generated by including a rotating fan, propeller, or other repeatably displaceable member as described in this disclosure.

Figure 18:
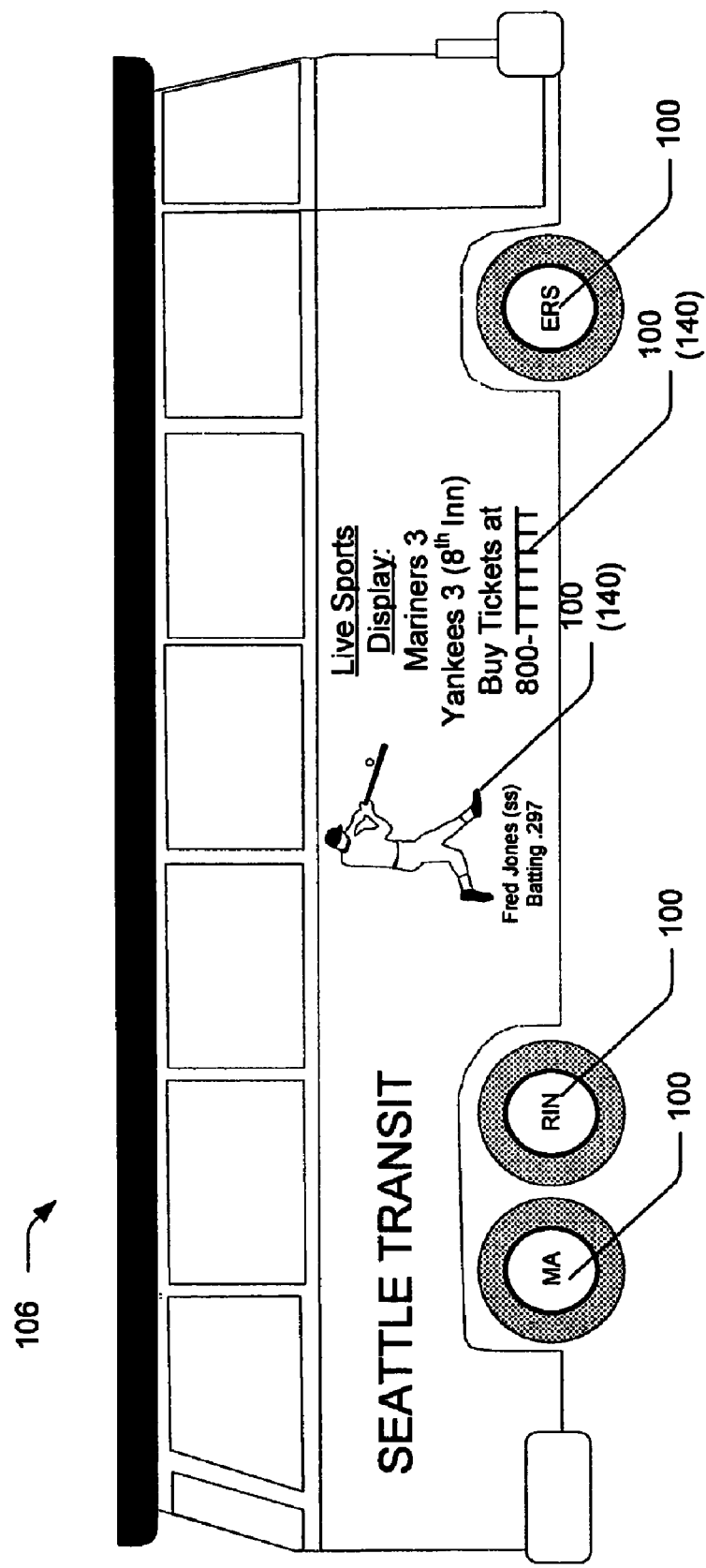
FIG. 18 is a view of still another embodiment of the repeatably displaceable emanating element display.

FIG. 18 shows one embodiment of a vehicle or mobile device 106 (e.g., a bus) that is configured to display a scene using an embodiment of the repeatably displaceable emanating element display 100. News, advertisement, sports, music, etc. could each be displayed on or proximate a side or other location of the bus using holographic, projection, illumination, or other techniques as described in this disclosure. With certain holographic embodiments of the repeatably displaceable emanating element display 100, certain displays of the vehicle-related information could be physically separated from the side of the bus, for example, such as to give the illusion perhaps of a person or other object moving down the roadway. The displayed image(s) could even be physically separated from the bus using holographic projection techniques as described in this disclosure.

Certain embodiments of the repeatably displaceable emanating element display 100 could even be configured as a danger alerter. For example, certain embodiments of aircraft or boat propellers and/or engines can project the at least one synchronously modifiable oriented image(s) 102 configured as a warning, such as to display or project warnings about how far to stand back as described with respect to FIG. 13. For example, a line could be projected on the airport pavement within a certain distance of the operating propeller, with the orientation stabilized displayed warning being projected, either on or close to the displaceable propeller, near the propeller such as with a holographic or video display, and/or in the general area of the propeller. The use of certain embodiments of the repeatably displaceable emanating element display 100 to provide graphics, text, and other information relating to rotating propellers, impellers, turbines, and other rotating, machinery, etc., which could be used to limit the number of individuals who inadvertently, sometimes fatally, walk into the rotating machinery such as a propeller, jet engine, fan, compressor, lawnmower, or turbine without even being aware that the vehicle or mobile device 106 is operating and/or the location of the vehicle or mobile object.

Figure 13:
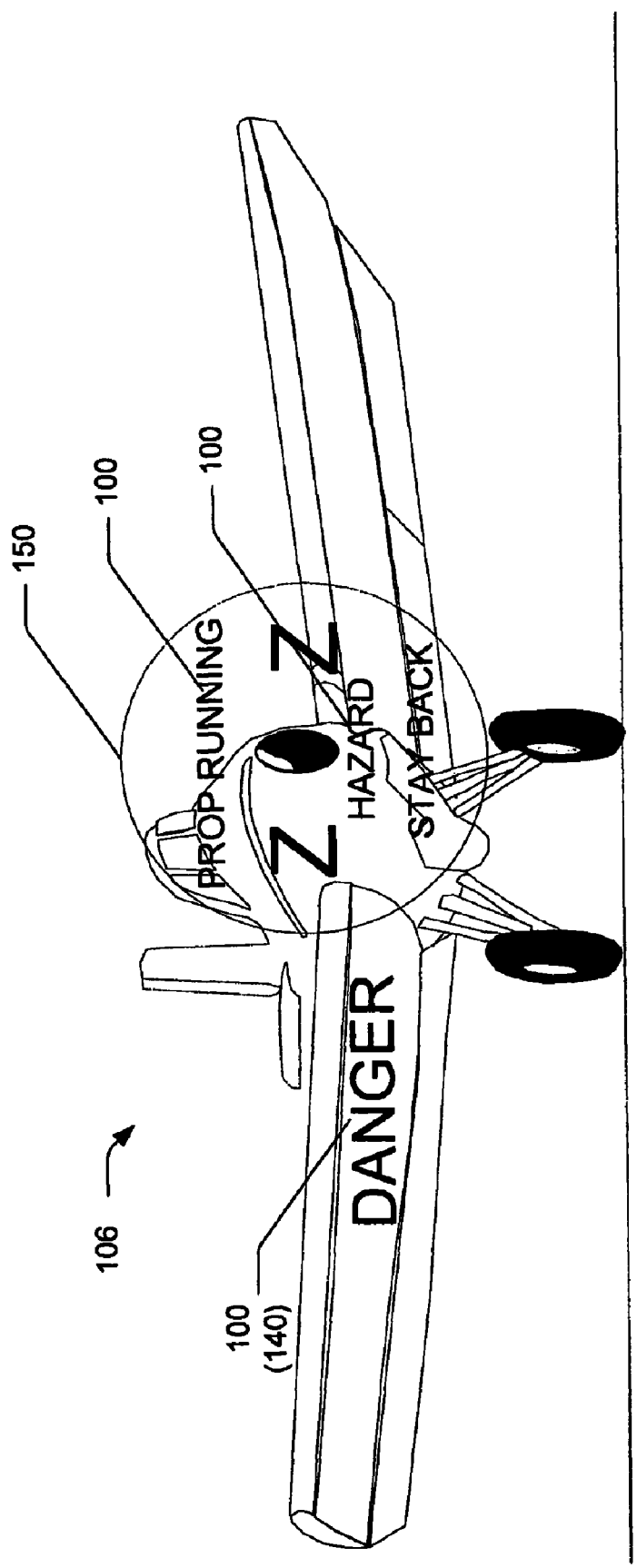
FIG. 13 is a view of another display emanating object having another embodiment of the repeatably displaceable emanating element display.
Figure 14:
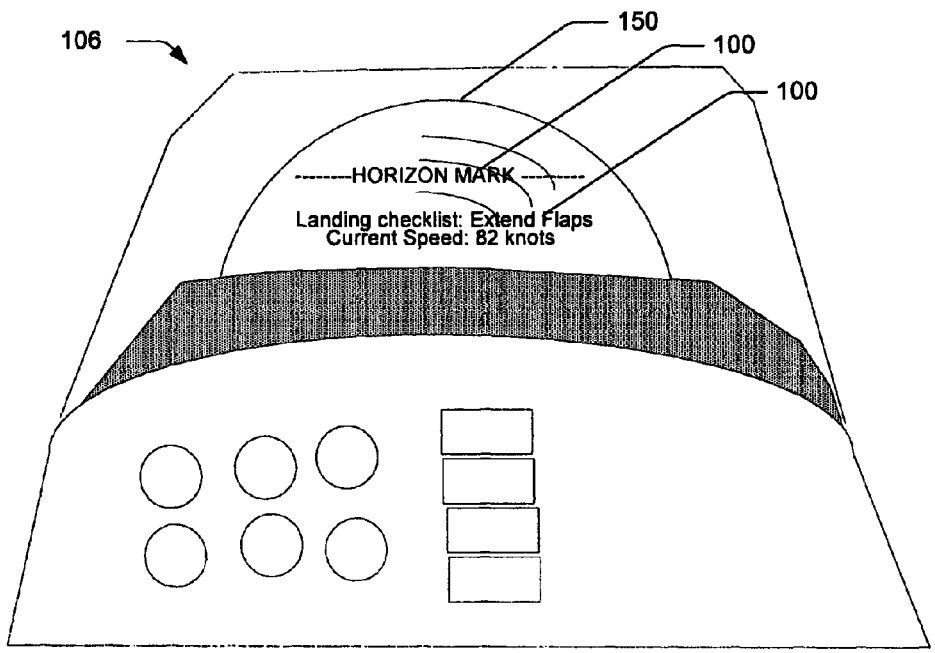
FIG. 14 is a view of another display emanating object having another embodiment of the repeatably displaceable emanating element display.

A variety of propeller-display embodiments of the repeatably displaceable emanating element display 100 can be provided that apply an advertisement, hazard warning, instrumentation, operation, and the like, corresponding at least partially to the vehicle-related information, as described with respect to FIGS. 13 and 14. FIG. 13, for example, illustrates an embodiment of the repeatably displaceable emanating element display 100 that can be configured to display a warning to a person getting too close to the propeller. While an aircraft propeller is illustrated as an airplane propeller, certain similar hazard warnings could be provided for helicopter propeller warnings, boat or ship propeller warnings, and/or other propeller warnings. Helicopter propellers have the advantage for display purposes of being relatively large, and thereby have a large area to display a variety of configurable vehicle-related information that could be seen from a considerable distance potentially by a larger number of people. In addition, other mechanical displaceable machinery can rotate such as turbines, fans, lawnmower blades, compressors, impellers, vehicle fans, gears, pulleys, etc. as described with respect to FIG. 19, can also be provided with the vehicle-related information that can provide a similar or suitable hazard warning to warn people passing by about their presence or operation. It is often difficult for people to view displaceable propellers, displaceable machinery, etc., and as such certain embodiments of the repeatably displaceable emanating element display 100 can provide a warning to others.

Consider that the warning provided by certain embodiments of the repeatably displaceable emanating element display 100 can vary considering where the viewer is relative to the repeatably displaceable emanating element display. For instance, a different warning may be provided on the front and back of the rotating member (as directed by different vehicle-related information) as described with respect to FIG. 13, which may depend on where or how the rotating member is likely to be viewed.

Additionally, certain embodiments of the repeatably displaceable emanating element display 100 can include the sensor 817 as described with respect to FIG. 12, which can sense position of people, animals, birds, etc. relative to the vehicle. As such, the repeatably displaceable emanating element display 100 could be configured with suitable vehicle-related information (which may be sensed using an appropriate sensor 817 of FIG. 12) to sense whether a bird strike, animal strike, or contact with a person is imminent, in which instance certain embodiments of the repeatably displaceable emanating element display 100 could provide a heightened hazard indicator and/or be reconfigured such as to limit the possibility and/or effects of the hazard. Certain embodiments of the repeatably displaceable emanating element display 100 can provide a displayed effect to animals, birds, persons, etc. in an attempt to scare them away from vehicles, or at least warn them of the presence of the vehicle, etc. such as to reduce the occurrence of bird strikes, etc. Certain embodiments of the repeatably displaceable emanating element display 100 could provide an alert to others in flight, on the ground, etc. such as to make the vehicle more visible from a distance at least for certain periods. In certain embodiments, an audio and/or visual warning could be provided in combination with the repeatably displaceable emanating element display 100, such as to perhaps alert or scare persons, animals, or birds away from the operating propeller. Perhaps as the person, animal, or bird is physically advised as to the location of the rotating propeller, wheel, etc., then the hazard appearance or level of certain embodiments of the repeatably displaceable emanating element display 100 (as with the audio warning) can be reduced.

For instance, certain embodiments of the repeatably displaceable emanating element display 100, as described with respect to this disclosure, could emanate illumination that can be focused at a particular range of focal distances, and might appear blurry outside of the focal range. Consider, for example, that certain embodiments of vehicle or mobile device 106 such as aircraft or helicopter propellers, automobile fans and pulleys, gears, etc. can display information that could be used to sense a relative location of people, animals, or birds relative to the propeller particularly within a prescribed range, and thereby perhaps provide a suitable proximity alarm. Note that so-called bird-strikes can provide a very real and sometimes fatal hazard to pilots and/or occupants of aircraft as corresponds to the vehicle-related information.

Certain embodiments of the repeatably displaceable emanating element display 100, such as associated with propellers for vehicles or mobile devices, can display such vehicle-related information as may be useful for operation thereof, or provide some other function. For example, certain embodiments of the repeatably displaceable emanating element display 100 could provide the vehicle-related information as a warning if a portion of a propeller icing over (not shown) such as could easily be detected if the sensor 817 which could be configured to sense icing (as described with respect to FIG. 12), and/or other portions of the repeatably displaceable emanating element display controller 97, were on, in, or proximate the propeller and/or jet engine itself. As such, certain embodiments of the sensor 817 as described with respect to FIG. 12 can sense a variety of conditions and/or hazards which may or may not be associated with the operation of the vehicle. Certain embodiments of the repeatably displaceable emanating element display 100 could be provided with a horizon indicator as illustrated in FIG. 14, which could in certain embodiments rely on such vehicle-related information as could be adjusted by the pilot and/or be sensed by a variety of sensor based on such parameters as aircraft velocity, angle of attack, load, etc.

During normal operation of the vehicle or mobile device 106 such as an aircraft, it is intended that the horizon indicator should, when aligned with the horizon, tend to maintain the aircraft in a straight-and-level flight configuration, and limit "purposing" of the aircraft in which the aircraft travels up and down excessively due (among other factors) as poor vertical guidance of the aircraft. Excessive "purposing" of the aircraft during flight can be dangerous, can waste considerable fuel, and can make certain ones of the flying crew passengers nauseous. As such, by configuring certain embodiments of aircraft with repeatably displaceable emanating element display 100 (e.g., on the displaceable propeller) that would be aligned with the horizon such as to ensure the pilot fly straight and level might save a considerable amount of money, enhance safety, improve enjoyment, and limit sickness during air travel.

Figure 15:
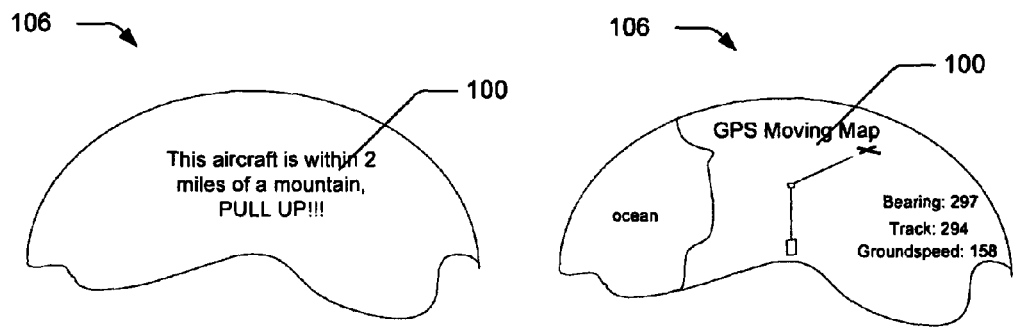
FIG. 15 is a view of still another embodiment of the repeatably displaceable emanating element display.

Additional flight information can be provided to drivers, operators, pilots, occupants, assistants, etc. in certain embodiments of repeatably displaceable emanating element display 100 that may be configured as propellers, jet engines, etc. as described with respect to FIGS. 14 and 15. As such, certain embodiments of the repeatably displaceable emanating element display 100, including a displaceable propeller or jet engine, could be considered to be configured as and/or operate as a heads up display, or the like. Certain embodiments of the repeatably displaceable emanating element display 100 could be configured to project or display a variety of vehicle-related information, such as may correspond to a sensed position, velocity, attitude, altitude, magnetic direction, or other information or derived information ahead of the windshield and/or from the propeller, etc. as described in this disclosure.

Figure 16:
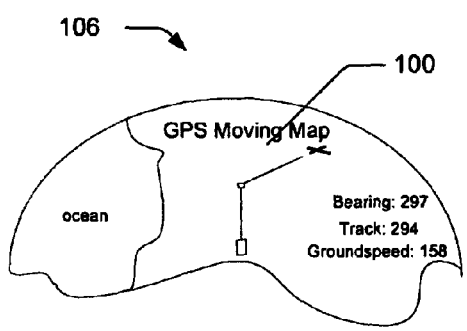
FIG. 16 is a view of yet another embodiment of the repeatably displaceable emanating element display.
Figure 17:
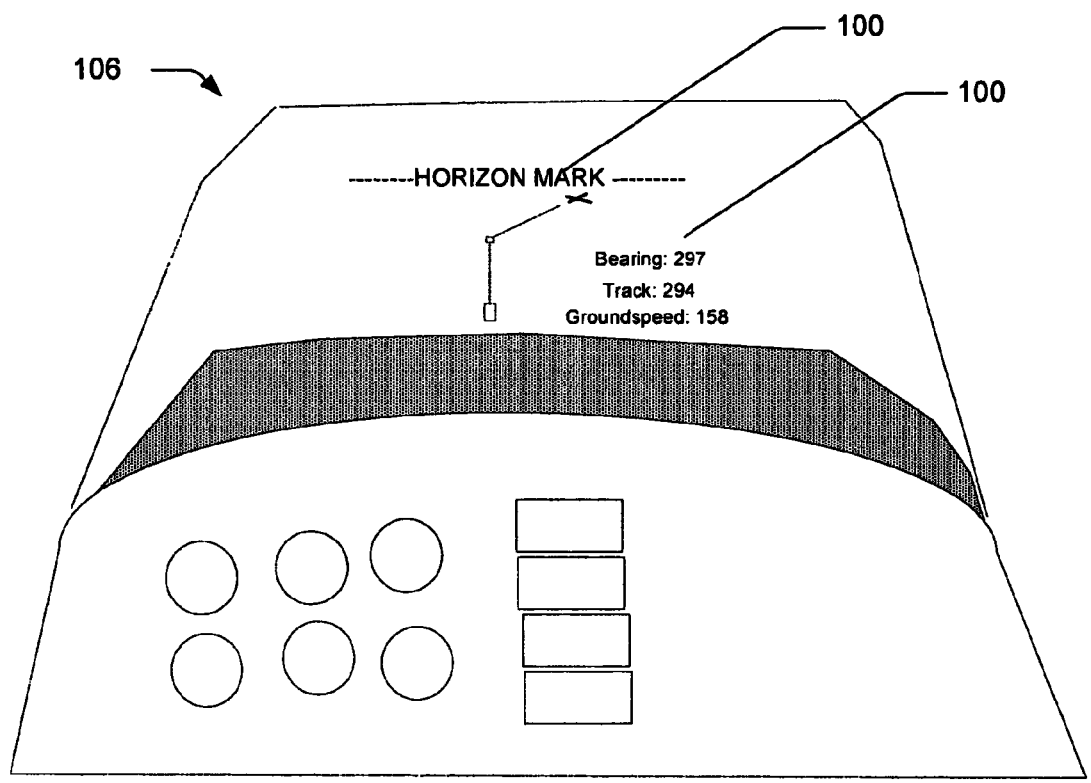
FIG. 17 is a view of another embodiment of the repeatably displaceable emanating element display.
Figure 19:
FIG. 19 is a view of yet another embodiment of the repeatably displaceable emanating element display.

Certain embodiments of the repeatably displaceable emanating element display 100 as described with respect to FIGS. 15 and 16, could also be configured to provide or display the vehicle-related information in the form of a moving map as described with respect to FIGS. 16 and 17, such as is known with displays for avionics, and more particularly using global positioning system (GPS), LORAN, or other location, position, or angular deriving systems. Certain embodiments of the GPS or other positional information could display and/or generate the vehicle-related information associated with the moving map, or other vehicle-related information which may be displayed on the propeller, either remotely from the propeller and transmit the information to the propeller, within the propeller, and/or a combination thereof. As such, certain repeatably displaceable emanating element display 100 can be configured to provide the vehicle-related information and/or associated graphics to such viewers as pilots or crew of aircraft in a form similar to being provided in certain heads-up displays.

Certain embodiments of the repeatably displaceable emanating element display 100 can be provided and/or appear to emanate from, for example, outside of the cabin of the aircraft such as forward of the windshield, and/or inside the cabin; and certain embodiments of the repeatably displaceable emanating element display may be associated with equipment, sensors, and/or actuators to at least partially provide the vehicle-related information that may also be desirably situated outside of the aircraft cabin (e.g., temperature sensor, icing sensor, pressure sensor, etc.) in a form whose information, images, text, etc. may be readily provided to the user or viewer. Certain embodiments of propellers being configured as the repeatably displaceable emanating element display 100 can include an antenna either mounted to the antenna or otherwise associated therewith, and such antennas can be used to transmit information relating to the operation of the repeatably displaceable emanating element display 100 either to or from the propeller. While certain embodiments of the repeatably displaceable emanating element display 100 as described with respect to aircraft in FIGS. 13 to 16, it is also envisioned that certain embodiments may be modified to be applied to provide operation information and/or warnings on other vehicles such as railroads, cars, trucks, busses, ships, bicycles, helicopters, etc.

Certain embodiments of the repeatably displaceable emanating element display 100 can thereby be configured in a variety of configurations to project sequences or streams of the synchronously modifiable oriented image(s) 102 from one portion of the vehicle or mobile device 106 such as the vehicle or mobile device on to another portion of the display emanating object. Certain embodiments of the repeatably displaceable emanating element display 100 may be applied to static or semi-static repeatably displaceable display emanating element(s) 130. Certain embodiments of the repeatably displaceable emanating element display 100 can thereby be configured to provide the synchronously modifiable oriented image(s) of a variety of grades (including movie-quality grade) of moving and/or static display and/or such as could be broadcast in a variety of lengths of streams. Certain embodiments of the synchronously modifiable oriented image(s) 102 relating to the vehicle-related information, as may be provided by the repeatably displaceable emanating element display 100 (of both the projection, illumination, and/or holographic types), may or may not be cyclic, high spectral and spatial content quality. Certain embodiments of the repeatably displaceable emanating element display 100 may provide movie or monitor grade projections of the synchronously modifiable oriented image(s) 102 that can be arbitrarily long, as limited by available technology and desired image quality.

Certain embodiments of the repeatably displaceable emanating element display 100 may be configured to use phase screens associated with certain embodiments of the vehicle or mobile device 106, such as the sides, fenders, etc of the vehicle or mobile device 106 and project holographic, video, or other synchronously modifiable oriented image(s) 102 in that manner. Certain embodiments of the repeatably displaceable emanating element display 100 can also use optical surfaces to display the synchronously modifiable oriented image(s) 102, such as may be situated on the wheel, and projectors, such as in the wheel well. Certain embodiments of the synchronously modifiable oriented image(s) 102 could project holographic or video synchronously modifiable oriented image(s) 102 corresponding to the vehicle-related information from hubcaps, wheels, etc. to a variety of vehicle-static locations, such as side of the vehicle, wheel well, etc. In certain instances, an actuating mechanism that can be stationary relative to the display emanating object such as the vehicle or mobile device can be provided that actuates each repeatably displaceable display emanating element(s) 130 for a brief duration depending upon its location relative to the desired synchronously modifiable oriented image(s) 102, and the synchronously modifiable oriented image(s) can thereupon be generated by actuating each of the repeatably displaceable display emanating element(s) 130 to be of the suitable or desired color, shape, contour, etc. based at least in part on the vehicle-related information.

Certain embodiments of the repeatably displaceable emanating element display 100 can provide wheel projections of the synchronously modifiable oriented image(s) 102 which can take advantage of the rotation speed of the wheel to alter the synchronously modifiable oriented image(s) based on modification of the vehicle-related information. Certain embodiments of the repeatably displaceable emanating element display 100 can, for example, utilize off-axis spherical geometry in order to take advantage of wheel rotation for changing the synchronously modifiable oriented image(s) based on modification of the vehicle-related information. Consider that during typical usage of certain embodiments of the vehicle or mobile device 106, such as the vehicle or mobile device traveling with highway and other roadway velocities, the hubcap is typically displaceable at a sufficiently angular velocities as to be above the flicker rate of the human eye, and therefore certain embodiments of the repeatably displaceable emanating element display 100 and so can use the rotation velocity of the wheels, etc. to strobe different static images into the eye. Such strobing of certain embodiments of the repeatably displaceable display emanating element(s) 130 may occur during each, every second, every third, or more rotations of the displaceable member such as to create certain embodiments of the synchronously modifiable oriented image(s) 102 corresponding to the vehicle-related information. As such, certain embodiments of the repeatably displaceable emanating element display 100 having a sustained sequence of high quality imagery of the synchronously modifiable oriented image(s) 102 from certain embodiments of the vehicle or mobile device 106 such as the vehicles or mobile devices, particularly those in motion.

Certain configurations of the certain embodiments of the repeatably displaceable emanating element display 100 may have to be altered from those of traditional vehicles with no display such as to provide the desired projecting, illumination, and/or holographic embodiments of the synchronously modifiable oriented image(s) 102. For example, certain embodiments of the repeatably displaceable emanating element display 100 as projected from hubcaps, etc., may have to be extended outwardly of the vehicle or mobile device 106 to allow projecting light onto surfaces of the vehicle or mobile device.

Certain embodiments of the repeatably displaceable emanating element display 100 can involve arranging a linear array or other arrangement of the repeatably displaceable display emanating element(s) 130 relative to the repeatably displaceable emanating element display 100, as described with respect to this disclosure. Certain embodiments of the repeatably displaceable display emanating element(s), by comparison, may be contoured, irregular, and/or have some non-linear pattern, such as may be the instance if applied to a contoured propeller blade, for example. By spinning the repeatably displaceable emanating element display 100 at a desired rotational rate based at least in part on the configuration of the repeatably displaceable display emanating element(s) 130, a desired moving image, hologram, video, etc. can be constructed and/or maintained. Certain embodiments of the repeatably displaceable emanating element display 100 can thereby project desired synchronously modifiable oriented image(s) 102 on the hubcap surface, tire, wheel, or other rotatable surface as it spins during operation. As certain embodiments of the repeatably displaceable emanating element display 100 of the arrangement of light emitters may rotate and/or project the desired moving image, hologram, video, or other embodiment of the synchronously modifiable oriented image(s) 102 as corresponding to the vehicle-related information.

With certain synchronously modifiable oriented image(s) 102, the pattern can be changed using according to a control or computer program (e.g., altering with the timer/sequencer 815 of FIG. 12) and/or the linear pattern of the repeatably displaceable emanating element display 100 can therefore create the moving picture, video, hologram, etc. Certain embodiments of the repeatably displaceable emanating element display 100 could therefore provide a relatively high resolution display of the synchronously modifiable oriented image(s) 102, which may be desired to provide whichever information and/or graphics as may be desired. Certain embodiments of the repeatably displaceable emanating element display 100 can therefore involve an information transfer mechanism, and can be configured to download, update, archive, store, recall, and/or otherwise process information into system, etc. such as to provide the desired synchronously modifiable oriented image(s) 102.

Certain embodiments of the repeatably displaceable emanating element display 100 can be applied to a variety of objects in motion such as sports such as balls, bats, or clubs. Certain embodiments of the repeatably displaceable emanating element display 100 can therefore be configured to provide advertising, etc. with certain embodiments of the synchronously modifiable oriented image(s) 102. Certain vehicular embodiments of the synchronously modifiable oriented image(s) 102 can be applied to advertise a variety of the vehicle or mobile devices 106, such as on cars, trucks, off-road vehicles or mobile devices, boats, trucks, trains, aircraft, sports equipment, heavy machinery, etc. either for active displays, or also for passive displays.

Also, certain embodiments of the synchronously modifiable oriented image(s) 102 could be generated using windshield wipers configured as repeatably displaceable emanating element display 100, and also on certain vehicle or mobile device 106 such as can be provided on certain human-operated or powered vehicles or mobile devices. Certain embodiments of the repeatably displaceable emanating element display 100 could display a variety of the vehicle-related information on such displaceable sports devices as on a shaft of a golf club or hockey stick, a baseball bat, etc. so that when the club, hockey stick, bat, or similar rotated object is swung, it could create a variety of the synchronously modifiable oriented image(s) 102, certain embodiments of which may provide an advertising and/or product identification image. Certain embodiments of the repeatably displaceable emanating element display 100 could be configured with synchronizing with a camera which might be taping the event. Certain embodiments of the repeatably displaceable emanating element display 100 could provide the synchronously modifiable oriented image(s) 102 that may be modified relating to the vehicle-related information on the vehicle or mobile device 106 that may be provided, for example, on wheel spokes of bicycles. Certain embodiments of the repeatably displaceable emanating element display 100 could thereby be provided on the wheel spokes of bicycles that can provide such varied operations as hazard warning, illumination, advertising, identification, or decoration. As such certain aspects of the repeatably displaceable emanating element display 100 that are described with respect to vehicles or mobile devices in this disclosure can be applied to powered, as well as human powered vehicles or mobile devices.

Certain embodiments of the synchronously modifiable oriented image(s) 102 could thereupon be expanded to include other objects in motion in sports such as balls, bats, and clubs, which might be attractive places to put advertising or item identification in particular. Specifically, certain embodiments of the repeatably displaceable display emanating element(s) 130 could be put on the shaft of a club, hockey stick, or other linear object so that when the club is swung it creates the advertising image. It may also be possible to synchronize the projected image with such vehicle-related information that may be provided, e.g., from an imager or a camera such as which might be taping the event.

There are a variety of types of the synchronously modifiable oriented image(s) 102 that can be created based at least in part on received vehicle-related information. For example, certain embodiments of the repeatably displaceable emanating element display 100 can be configured to provide the at least one synchronously modifiable oriented image(s) 102 relating to the vehicle-related information. Certain embodiments of the synchronously modifiable oriented image(s) 102 can be provided as a hazard warning on dangerous displaceable machines, such as turbines, compressors, propellers, lawnmower blades, etc. such as to warn the operator or other person to stay away from a dangerous or other region.

Certain embodiments of the repeatably displaceable emanating element display 100 can be configured such as to display a color image corresponding at least in part on the vehicle-related information, in which a number of the repeatably displaceable display emanating element(s) 130 in color, such as with red, blue, and green (or other color such as is understood to create a color image), for example, may provide certain embodiments of the synchronously modifiable oriented image(s) 102. For example, with respect to FIG. 9, each dot, pixel, and/or repeatably displaceable display emanating element(s) 130 may represent one or more of a red, a blue, and a green repeatably displaceable display emanating element. To display a monochrome image, by comparison, only one color of the repeatably displaceable display emanating element(s) 130 may be used for all of the pixels, dots, or repeatably displaceable display emanating element(s). In part, the density of pixels on the wheel determines the resolution of the image and the image displayed depends on the repeatably displaceable display emanating element(s) 130 that are illuminated at any given time. Associated with each pixel is a position in radial coordinates and, if the wheel is moving, a radial velocity; each of which may be utilized by the timer/sequencer 815 of FIG. 12 in creating the synchronously modifiable oriented image(s) considering the vehicle-related information with the desired and/or planned orientation.

Certain embodiments of the repeatably displaceable emanating element display 100 can thereby be configured such that the spatial pattern formed by the lit repeatably displaceable display emanating element(s) 130 may have a known time varying or constant orientation. Certain embodiments of the repeatably displaceable emanating element display 100 can be configured such that the repeatably displaceable display emanating element(s) 130 are connected to the repeatably displaceable emanating element display controller 97, which determines which repeatably displaceable display emanating element(s) will be lit and for how long as a function of time in order to form a desired synchronously modifiable oriented image(s) relating to the vehicle-related information. Certain embodiments of a program of the repeatably displaceable emanating element display controller 97 that determines which repeatably displaceable display emanating element(s) 130 can operate as a function of, the position, the repeatable duration, the radial velocity of the repeatably displaceable display emanating element(s) 130 as the pixel(s) used to generate the synchronously modifiable oriented image(s) 102. In one embodiment, the wheel has only a linear array of the repeatably displaceable display emanating element(s) 130 (possibly along a diameter) that sweep out the synchronously modifiable oriented image(s) 102 over time. Irregular, contoured, curved, or other configurations of the repeatably displaceable display emanating element(s) 130 can be suitably actuated to provide the synchronously modifiable oriented image(s) 102, based at least in part on the vehicle-related information. In certain embodiments, a user of the display emanating object (perhaps, the driver, operator, or occupant of the vehicle or mobile device) can control certain embodiments of the synchronously modifiable oriented image(s) 102 over time.

Certain embodiments of the synchronously modifiable oriented image(s) 102 can be projected on or from the display emanating object at least partially using the repeatably displaceable display emanating element(s) 130 as a 3D image, such as by using holographic techniques. Certain embodiments of the repeatably displaceable emanating element display 100 can be configured such that each of the repeatably displaceable display emanating element(s) 130 can, or may not, provide consistent illumination, color, intensity, range, etc. based on the vehicle-related information. For example, consider that certain embodiments of the repeatably displaceable emanating element display 100 can be configured as to have dissimilar dimensions and can thereby, by providing a similar illumination density, illuminate by different amounts based at least in part on their respective dimensions. Certain embodiments of the repeatably displaceable display emanating element(s) 130 can thereby be selected to be illuminated at a particular position to at least partially create the synchronously modifiable oriented image(s) 102, based at least in part on how much illumination is desired considering the vehicle-related information. As such, if it is desired to provide a greater illumination at a particular location, a larger or brighter repeatably displaceable display emanating element(s) 130 may be illuminated (i.e., strobed) at a range of motion corresponding to the particular location considering the vehicle-related information. If it is desired to provide a lesser illumination, a smaller or fainter repeatably displaceable display emanating element(s) 130 may be illuminated (i.e., strobed) at the range of motion corresponding to the particular location considering the vehicle-related information. As such, different repeatably displaceable display emanating element(s) 130 may be actuated to provide different illumination intensities, colors, brightness, regions, etc. considering the vehicle-related information.

Certain embodiments of the repeatably displaceable emanating element display 100 can serve as a screen to project certain embodiments of the synchronously modifiable oriented image(s) 102 considering the vehicle-related information. Certain embodiments of the repeatably displaceable emanating element display 100 may be partially or mostly covered with a substantially planar-oriented configuration suitable for projecting certain embodiments of the synchronously modifiable oriented image(s) 102 considering the vehicle-related information. One possibility would be projecting holographic embodiments of the synchronously modifiable oriented image(s) 102 onto hubcaps from wheel wells. Wheel projections can take advantage of the rotation speed of the wheel to alter the synchronously modifiable oriented image(s) 102 based at least in part on the vehicle-related information. A variety of techniques and/or technology may be associated with projecting a hologram, and hologram techniques will not be further described herein. Certain embodiments of the repeatably displaceable emanating element display 100 may be configured as to include an "Electrically Addressable Spatial Light Modulator" (EASLM), such as may be used to create a dynamically variable hologram.

At least certain surfaces of the vehicle may be covered with a variety of repeatably displaceable display emanating element(s) 130 whose color can be changed similar to the Glo-Car™, that is a trademark of Ford, as described with respect to the website: http://www.cardesignnews.com/news/2003/030512ford-glocar/ (incorporated herein by reference). The concept of covering at least a portion of the vehicle or movable device with repeatably displaceable display emanating element(s) 130 could allow for projecting images (instead of simply changing the color of the car) at the user's, owner's, or operator's discretion. For example, the repeatably displaceable display emanating element(s) 130 may be lit to form an image (either monochrome or in color, as described above for the wheel), that may be either static, or where the image may change with time in order to project a video, etc. based at least in part on the vehicle-related information. Certain embodiments of the synchronously modifiable oriented image(s) 102 may be configured as an advertisement, information, identification, hazard warning, etc. Certain embodiments of the vehicle or mobile device 106, such as may be configured as the vehicle or mobile device, can serve as the screen to project the synchronously modifiable oriented image(s) 102, as described above for the wheel.

Certain embodiments of the device that projects the synchronously modifiable oriented image(s) 102 may thereby be situated on the vehicle or mobile device 106, such as the vehicle or mobile device, etc. based at least in part on the vehicle-related information. In another embodiment, the device that projects the synchronously modifiable oriented image(s) 102 can be mounted externally from the vehicle or mobile device 106 such as the vehicle or mobile device. This disclosure describes a number of techniques and/or mechanisms to project sequences or streams of the synchronously modifiable oriented image(s) 102 from one portion of the vehicle or mobile device 106 such as a moving vehicle or mobile device on to another portion of the vehicle or mobile device corresponding to the vehicle-related information. Certain embodiments of this disclosure can be applied to a variety high grade synchronously modifiable oriented image(s) 102 which can be broadcast in long streams, which may or may not be cyclic, having high spectral and spatial content quality, and which may be movie or monitor grade projections corresponding to the vehicle-related information. The synchronously modifiable oriented image(s) 102 can vary in length in certain configurations.

2. CERTAIN EMBODIMENTS OF THE REPEATABLY DISPLACEABLE EMANATING ELEMENT DISPLAY CONTROLLER

This disclosure describes a number of embodiments of the repeatably displaceable emanating element display controller 97 as described with respect to FIG. 12, which are intended to control operations of the repeatably displaceable emanating element display 100. Certain embodiments of the repeatably displaceable emanating element display 100 can include the repeatably displaceable emanating element display controller 97; while other embodiments of the repeatably displaceable emanating element display 100 may not include utilizing certain embodiments of the repeatably displaceable emanating element display controller. For instance, certain embodiments of the repeatably displaceable emanating element display 100 including the repeatably displaceable emanating element display controller 97, which can be largely microprocessor-based, and can provide for largely automated operation or assembly of the repeatably displaceable emanating element display 100. By comparison, certain embodiments of the repeatably displaceable emanating element display 100 can be operated utilizing largely manual techniques, and may not utilize the repeatably displaceable emanating element display controller 97. FIG. 12 thereby shows a block diagram of certain embodiments of the repeatably displaceable emanating element display 100 that can include the repeatably displaceable emanating element display controller 97.

Certain embodiments of the repeatably displaceable emanating element display 100 can include the timer/sequencer 815 and/or the sensor 817, as described elsewhere in this disclosure. Certain embodiments of the repeatably displaceable emanating element display 100 thereby can include, but is not limited to, any particular configuration of the repeatably displaceable emanating element display controller 97. Certain embodiments of the repeatably displaceable emanating element display controller 97 can be computer based, controller based, mote based, cellular telephone-based, electrical, electro-mechanical, mechanical, and/or electronics based. Certain embodiments of the repeatably displaceable emanating element display controller can be segmented into modules or network nodes, and can utilize a variety of wireless communications and/or networking technologies to allow information, data, etc. to be transferred to the various distinct portions or embodiments to perform, a variety of operations associated with of the repeatably displaceable emanating element display 100. Certain embodiments of the repeatably displaceable emanating element display controller 97 can be configured as a unitary, combined, or stand-alone device. A variety of antennas, network devices, software, and/or hardware, etc., can be utilized to provide communications between at least one repeatably displaceable emanating element display 100 and other "networked" devices.

Certain embodiments of the repeatably displaceable emanating element display controller 97 can vary as to their automation, complexity, and/or sophistication; and can be utilized to control, setup, establish, and/or maintain communications between a number of vehicle or mobile device 106, such as may be provided on the vehicle or mobile device. As described within this disclosure, multiple ones of the different embodiments of the vehicle or mobile device 106 that can provide the repeatably displaceable emanating element display 100 can transfer information or data relating to the communication link to or from a remote location and/or some intermediate device as might be associated with communication, monitoring and/or other activities.

Certain embodiments of the repeatably displaceable emanating element display controller 97, as well as certain embodiments of the repeatably displaceable emanating element display 100 (in general), can utilize distinct firmware, hardware, and/or software technology. For example, mote-based technology, microprocessor-based technology, microcomputer-based technology, general-purpose computer technology, specific-purpose computer technology, Application-Specific Integrated Circuits, and/or a variety of other computer technologies can be utilized for certain embodiments of at least a portion of the repeatably displaceable emanating element display controller 97, as well as be included in certain embodiments of the repeatably displaceable emanating element display 100.

Certain embodiments of the repeatably displaceable emanating element display controller 97 can as described with respect to FIG. 12 can include a processor 803 such as a central processing unit (CPU), a memory 807, a circuit or circuit portion 809, and an input output interface (I/O) 811 that may include a bus (not shown). Certain embodiments of the repeatably displaceable emanating element display controller 97 of the repeatably displaceable emanating element display 100 can include and/or be a portion of a general-purpose computer, a specific-purpose computer, a microprocessor, a microcontroller, a personal display assistant (PDA), a cellular phone, a digital phone, a wireless communicating device, a hard-wired phone, and/or any other known suitable type of communications device, computer, and/or controller that can be implemented in hardware, software, electromechanical devices, and/or firmware. Certain embodiments of the processor 803, as described with respect to FIG. 12 can perform the processing and arithmetic operations for certain embodiments of the repeatably displaceable emanating element display controller 97 of the repeatably displaceable emanating element display 100. Certain embodiments of the repeatably displaceable emanating element display controller 97 of the repeatably displaceable emanating element display 100 can control the signal processing, database querying and response, computational, timing, data transfer, and other processes associated with certain embodiments of the repeatably displaceable emanating element display controller 97 of the repeatably displaceable emanating element display 100.

Certain embodiments of the memory 807 of the repeatably displaceable emanating element display controller 97 can include a random access memory (RAM) and/or read only memory (ROM) that together can store the computer programs, operands, data, and/or other parameters that control the operation of certain embodiments of the repeatably displaceable emanating element display controller 97 of the repeatably displaceable emanating element display 100. The memory 807 can be configurable to contain information obtained, retained, or captured by that particular repeatably displaceable emanating element display controller 97 of the repeatably displaceable emanating element display 100.

Certain embodiments of the bus can be configurable to provide for digital information transmissions between the processor 803, circuits 809, memory 807, I/O 811, and/or the image memory or storage device (which may be integrated or removable). In this disclosure, the memory 807 can be configurable as RAM, flash memory, semiconductor-based memory, of any other type of memory that can be configurable to store data pertaining to images. The bus also connects I/O 811 to the portions of certain embodiments of the repeatably displaceable emanating element display controller 97 of either the repeatably displaceable emanating element display 100 that can either receive digital information from, or transmit digital information to other portions of the repeatably displaceable emanating element display 100, or other systems and/or networking components associated with.

Certain embodiments of the repeatably displaceable emanating element display controller 97 of the repeatably displaceable emanating element display 100, as described with respect to FIG. 12, can include a transmitter portion (not shown) that can be either included as a portion of certain embodiments of the repeatably displaceable emanating element display controller 97 of the repeatably displaceable emanating element display 100. Certain embodiments of the repeatably displaceable emanating element display controller 97 can alternately be provided as a separate unit (e.g., microprocessor-based). In certain embodiments, the transmitter portion can transmit image information between certain embodiments of the repeatably displaceable emanating element display controller 97 of the repeatably displaceable emanating element display 100.

Certain embodiments of the repeatably displaceable emanating element display controller 97 of the repeatably displaceable emanating element display 100 as described with respect to FIG. 12 can include an operation altering portion (not shown) that can be either included as a portion of certain embodiments of the repeatably displaceable emanating element display controller 97 of the repeatably displaceable emanating element display 100, or alternately can be provided as a separate unit (e.g., microprocessor-based).

Certain embodiments of the memory 807 can provide one example of a memory storage portion. In certain embodiments, the monitored value includes but is not limited to: a percentage of the memory 807, an indication of data that is or can be stored in the memory 807, or for data storage or recording interval. To provide for overflow ability for the memory 807 of certain embodiments of the repeatably displaceable emanating element display controller 97 of the repeatably displaceable emanating element display 100, a secondary storage device can be operably coupled to the memory 807 to allow a controllable transmitting of memory data from certain embodiments of the repeatably displaceable emanating element display controller 97 of the repeatably displaceable emanating element display 100 when the monitored value of data or other information within the memory 807 exceeds a prescribed value. The prescribed value can include, e.g., some percentage amount or some actual amount of the value.

In certain embodiments, a secondary communication link can be established between the certain embodiments of the repeatably displaceable emanating element display controller 97 of the repeatably displaceable emanating element display 100. The secondary communication link can be structured in a similar manner as, or indeed act as, a communication link; or alternatively can utilize network-based computer connections, Internet connections, etc. to provide information and/or data transfer between certain embodiments of the repeatably displaceable emanating element display controller 97 of the repeatably displaceable emanating element display 100.

In certain embodiments of the repeatably displaceable emanating element display controller 97 of the repeatably displaceable emanating element display 100, the particular elements of certain embodiments of the repeatably displaceable emanating element display controller 97 of the repeatably displaceable emanating element display 100 (e.g., the processor 803, the memory 807, the circuits 809, and/or the I/O 811) can provide a monitoring function to convert raw data as displayed by an indicator. A monitoring function as provided by certain embodiments of the repeatably displaceable emanating element display controller 97 of the repeatably displaceable emanating element display 100 can be compared to a prescribed limit, such as whether the number of images contained in the memory 807, the amount of data contained within the memory 807, or some other measure relating to the memory is approaching some value. The limits to the value can, in different embodiments, be controlled by the user or the manufacturer of certain embodiments of the repeatably displaceable emanating element display controller 97 of the repeatably displaceable emanating element display 100. In certain embodiments, the memory 807 can store but should not be limited to such information as: data, information, displayable information, readable text, motion images, video images, and/or audio images, etc.

In certain embodiments, the I/O 811 provides an interface to control the transmissions of digital information between each of the components in certain embodiments of the repeatably displaceable emanating element display controller 97 of the repeatably displaceable emanating element display 100. The I/O 811 also provides an interface between the components of certain embodiments of the repeatably displaceable emanating element display controller 97 of the repeatably displaceable emanating element display 100. The circuits 809 can include such other user interface devices as a display and/or a keyboard. In other embodiments, the repeatably displaceable emanating element display controller 97 of the repeatably displaceable emanating element display 100 can be constructed as a specific-purpose computer such as an application-specific integrated circuit (ASIC), a microprocessor, a microcomputer, or other similar devices.

As such, various embodiments of the repeatably displaceable emanating element display 100 and/or the repeatably displaceable emanating element display controller 97 can be configured utilizing relatively complex or simple computer and/or controller technology. As computer and/or controller technology evolves, it is intended that certain embodiments of the repeatably displaceable emanating element display 100 and/or the repeatably displaceable emanating element display controller 97 can be modified or adapted to utilize the modifying technology.

3. CERTAIN EMBODIMENTS OF THE REPEATABLY DISPLACEABLE EMANATING ELEMENT DISPLAY WITH RELEVANT FLOWCHARTS

Within the disclosure, flow charts of the type described in this disclosure apply to method steps as performed by a computer or controller. The flow charts can also apply to apparatus devices, such as an antenna or a node associated therewith that can include, e.g., a general-purpose computer or specialized-purpose computer whose structure along with the software, firmware, electro-mechanical devices, and/or hardware, can perform the process or technique described in the flow chart.

FIG. 20 shows one embodiment of the repeatably displaceable emanating element display 100 that can be configured to display the synchronously modifiable oriented image(s) 102 as described in this disclosure. Certain embodiments of the repeatably displaceable emanating element display 100 can be provided on, adjacent, between, and/or proximate a vehicle or mobile device.

Figure 22:
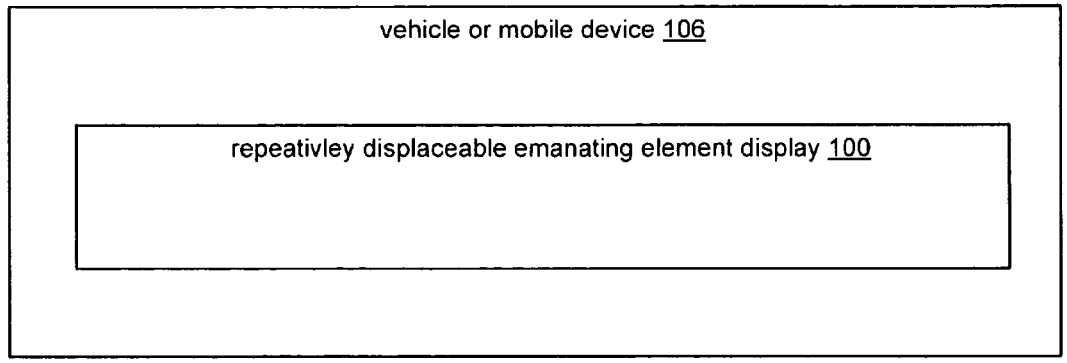
FIG. 22 is a block diagram of another embodiment of the repeatably displaceable emanating element display.

One embodiment of a high-level flowchart of a repeatably displaceable emanating element display technique 2000 is described with respect to FIGS. 23a and 23b and can include, but is not limited to, operation 2002, and optional operations 2010, 2012, 2014, 2016, 2018, 2020, 2022, 2024, and/or 2026. One embodiment of operation 2002 can include, but is not limited to, optional operations 2030 and/or 2032. The high-level flowchart of FIGS. 23a and 23b should be considered in combination with the embodiments of the repeatably displaceable emanating element display 100, as described with respect to FIG. 22. One embodiment of operation 2002 can include, but is not limited to, generating a repeatably displaceable emanating element display that may display at least part of an at least one synchronously modifiable oriented image based at least in part on alterable vehicle-related information, wherein the repeatably displaceable emanating element display may be synchronously modified as perceivable by a viewer at least partially by synchronizing an at least one repeatably displaceable display emanating element based at least in part on an orientation of the repeatably displaceable emanating element display as synchronously modified as perceivable by the viewer. For example, certain embodiments of the repeatably displaceable emanating element display 100 as described with respect to FIG. 11, can be provided using an embodiment of the at least one repeatably displaceable display emanating element based at least in part on the alterable vehicle-related information, which may reflect vehicle operating characteristics for example. Certain embodiments of the repeatably displaceable emanating element display 100 can be provided on, adjacent, and/or proximate a vehicle or mobile device such as car, a truck, a boat, an aircraft, a bus, a submarine, etc. One embodiment of the generating a repeatably displaceable emanating element display that may display at least part of an at least one synchronously modifiable oriented image based at least in part on alterable vehicle-related information, wherein the repeatably displaceable emanating element display may be synchronously modified as perceivable by a viewer at least partially by synchronizing an at least one repeatably displaceable display emanating element based at least in part on an orientation of the repeatably displaceable emanating element display as synchronously modified as perceivable by the viewer of operation 2002 can include operation 2030, that can include but is not limited to, generating a projectable repeatably displaceable emanating element display that may display the at least part of the at least one synchronously modifiable oriented image based at least in part on the alterable vehicle-related information. For example, certain embodiments of the repeatably displaceable emanating element display 100 can include a projection repeatably displaceable emanating element display, which can be directed, focused, steered, etc. One embodiment of the generating a repeatably displaceable emanating element display that may display at least part of an at least one synchronously modifiable oriented image based at least in part on alterable vehicle-related information, wherein the repeatably displaceable emanating element display may be synchronously modified as perceivable by a viewer at least partially by synchronizing an at least one repeatably displaceable display emanating element based at least in part on an orientation of the repeatably displaceable emanating element display as synchronously modified as perceivable by the viewer of operation 2002 can include operation 2032, that can include but is not limited to, generating an illumination repeatably displaceable emanating element display that may display the at least part of the at least one synchronously modifiable oriented image based at least in part on the alterable vehicle-related information. For example, certain embodiments of the repeatably displaceable emanating element display 100 can include an illumination repeatably displaceable emanating element display. One embodiment of operation 2010 can include, but is not limited to, wherein the generating a repeatably displaceable emanating element display that may display at least part of an at least one synchronously modifiable oriented image based at least in part on alterable vehicle-related information is performed at least partially in response to an activity. For example, certain embodiments of the repeatably displaceable emanating element display 100 can be performed at least partially in response to the activity. One embodiment of operation 2012 can include, but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via a networked communication system. For example, information relating to the repeatably displaceable emanating element display 100 is at least partially displayed within the networked communication system. One embodiment of operation 2014 can include, but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via an 802.11 communication system. For example, information relating to the repeatably displaceable emanating element display 100 is at least partially displayed within the 802.11 communication system. One embodiment of operation 2016 can include, but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via an optical communication system. For example, information relating to the repeatably displaceable emanating element display 100 is at least partially displayed within the optical communication system. One embodiment of operation 2018 can include, but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via a cell phone communication system. For example, information relating to the repeatably displaceable emanating element display 100 is at least partially displayed within the cell-phone communication system. One embodiment of operation 2020 can include, but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via a moving-image communication system. For example, information relating to the repeatably displaceable emanating element display 100 is at least partially displayed within the moving-image communication system. One embodiment of operation 2022 can include but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via a television communication system. For example, information relating to the repeatably displaceable emanating element display 100 is at least partially displayed within the television communication system. One embodiment of operation 2024 can include, but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via a video communication system. For example, information relating to the repeatably displaceable emanating element display 100 is at least partially displayed within the video communication system. One embodiment of operation 2026 can include, but is not limited to, wherein the generating a repeatably displaceable emanating element display that may display at least part of an at least one synchronously modifiable oriented image based at least in part on alterable vehicle-related information relies at least in part on the vehicle-related information that is at least partially transferred via a positional information communication system. For example, information relating to the repeatably displaceable emanating element display 100 is at least partially displayed within the positional information communication system. The order of the operations, methods, mechanisms, etc. as described with respect to FIG. 23 is intended to be illustrative in nature and not limited in scope.

Figure 24:
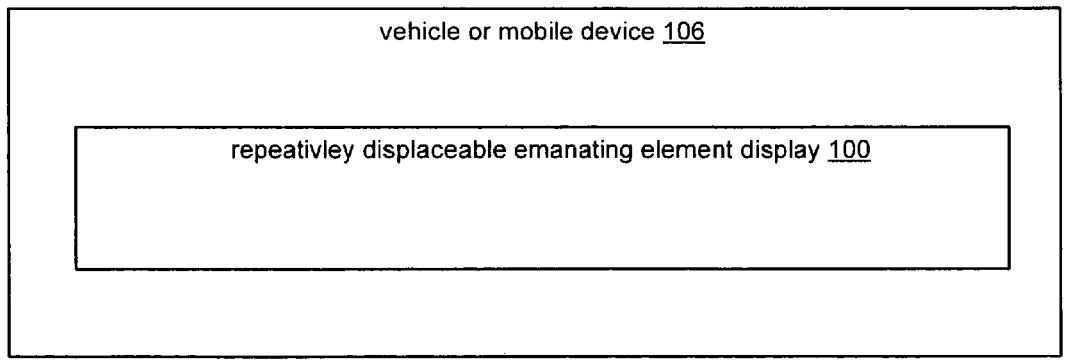
FIG. 24 is a block diagram of another embodiment of the repeatably displaceable emanating element display.

FIG. 24 shows another embodiment of the repeatably displaceable emanating element display 100 that can be configured to display the synchronously modifiable oriented image(s) 102 as described in this disclosure. Certain embodiments of the repeatably displaceable emanating element display 100 can be provided on, adjacent, between, and/or proximate a vehicle or mobile device.

Figure 25:
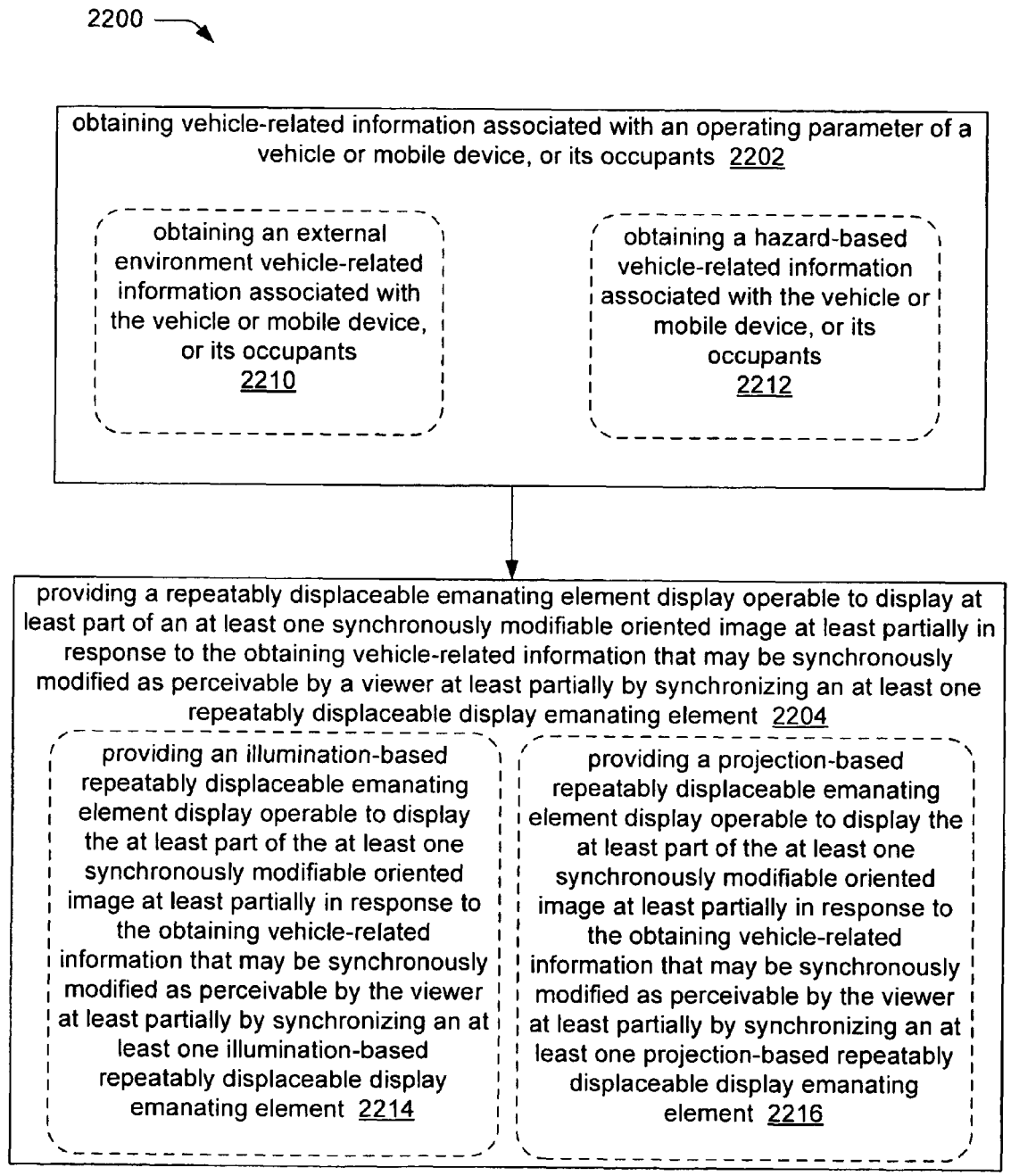
FIG. 25 is a flow chart of another embodiment of the repeatably displaceable emanating element display technique.

One embodiment of a high-level flowchart of a repeatably displaceable emanating element display technique 2200 is described with respect to FIG. 25 and can include, but is not limited to, operations 2202 and 2204. One embodiment of operation 2202 can include, but is not limited to, optional operations 2210 and/or 2212. One embodiment of operation 2204 can include, but is not limited to, optional operations 2214 and/or 2216. The high-level flowchart of FIG. 25 should be considered in combination with the embodiments of the repeatably displaceable emanating element display 100, as described with respect to FIG. 24. One embodiment of operation 2202 can include, but is not limited to, obtaining vehicle-related information associated with an operating parameter of a vehicle or mobile device, or its occupants. For example, certain embodiments of the repeatably displaceable emanating element display 100 as described with respect to FIG. 11, can be configured to obtain operational parameters. Certain embodiments of the repeatably displaceable emanating element display 100 can be provided on, adjacent, and/or proximate a vehicle or mobile device such as car, a truck, a boat, an aircraft, a bus, a submarine, etc. One embodiment of operation 2204 can include, but is not limited to, providing a repeatably displaceable emanating element display operable to display at least part of an at least one synchronously modifiable oriented image at least partially in response to the obtaining vehicle-related information that may be synchronously modified as perceivable by a viewer at least partially by synchronizing an at least one repeatably displaceable display emanating element. For example, certain embodiments of the repeatably displaceable emanating element display can be at least partially provided using certain embodiments of the repeatably displaceable emanating element(s). One embodiment of the obtaining vehicle-related information associated with an operating parameter of a vehicle or mobile device, or its occupants of operation 2202 can include operation 2210, that can include, but is not limited to, obtaining an external environment vehicle-related information associated with the vehicle or mobile device, or its occupants. For example, certain embodiments of the operational parameter information can include, but is not limited to, the external environment parameter such as temperature, pressure, distances, moving map information, etc. One embodiment of the obtaining vehicle-related information associated with an operating parameter of a vehicle or mobile device, or its occupants of operation 2202 can include operation 2212, that can include, but is not limited to, obtaining a hazard-based vehicle-related information associated with the vehicle or mobile device, or its occupants. For example, certain embodiments of the operational parameter can include, but is not limited to, the hazard-based operational parameter(s). One embodiment of the providing a repeatably displaceable emanating element display operable to display at least part of an at least one synchronously modifiable oriented image at least partially in response to the obtaining vehicle-related information that may be synchronously modified as perceivable by a viewer at least partially by synchronizing an at least one repeatably displaceable display emanating element of operation 2204 can include operation 2214, which can include, but is not limited to, providing an illumination-based repeatably displaceable emanating element display operable to display the at least part of the at least one synchronously modifiable oriented image at least partially in response to the obtaining vehicle-related information that may be synchronously modified as perceivable by the viewer at least partially by synchronizing an at least one illumination-based repeatably displaceable display emanating element. For example, certain embodiments of the illumination-based repeatably displaceable emanating element display can include the illumination-based repeatably displaceable emanating element display. One embodiment of the providing a repeatably displaceable emanating element display operable to display at least part of an at least one synchronously modifiable oriented image at least partially in response to the obtaining vehicle-related information that may be synchronously modified as perceivable by a viewer at least partially by synchronizing an at least one repeatably displaceable display emanating element of operation 2204 can include operation 2216, which can include, but is not limited to, providing a projection-based repeatably displaceable emanating element display operable to display the at least part of the at least one synchronously modifiable oriented image at least partially in response to the obtaining vehicle-related information that may be synchronously modified as perceivable by the viewer at least partially by synchronizing an at least one projection-based repeatably displaceable display emanating element. For example, certain embodiments of the illumination-based repeatably displaceable emanating element display can include the projection-based illumination-based repeatably displaceable emanating element display. The order of the operations, methods, mechanisms, etc. as described with respect to FIG. 25 is intended to be illustrative in nature, and not limited in scope.

In one or more various aspects, related systems include but are not limited to circuitry and/or programming for effecting the herein-referenced method aspects; the circuitry and/or programming can be virtually any combination of hardware, software, electromechanical system, and/or firmware configurable to effect the herein—referenced method aspects depending upon the design choices of the system designer.

4. CONCLUSION

This disclosure provides a number of embodiments of the repeatably displaceable emanating element display 100. The embodiments of the repeatably displaceable emanating element display 100, as well as certain embodiments of the vehicle or mobile device 106 as described with respect to this disclosure are intended to be illustrative in nature, and are not limiting its scope.

Those having skill in the art will recognize that the state of the art in computer, controller, communications, networking, and other similar technologies has progressed to the point where there is little potential operational distinction left between hardware, firmware, and/or software implementations of aspects of systems, such as may be utilized in the repeatably displaceable emanating element display. The use of hardware, firmware, and/or software can therefore generally represent (but not always, in that in certain contexts the choice between hardware and software can become significant) a design choice representing cost vs. efficiency tradeoffs. Those having skill in the art will appreciate that there are various vehicle or mobile device 106, such as vehicles or mobile devices, by which processes and/or systems and/or other technologies described herein can be effected (e.g., hardware, software, and/or firmware), and that the vehicle or mobile device 106 can vary with the context in which the processes and/or systems and/or other technologies are deployed. For example, if an implementer determines that speed and accuracy are paramount, the implementer and/or designer of the repeatably displaceable emanating element display may opt for mainly a hardware and/or firmware vehicle or mobile device. In alternate embodiments if flexibility is paramount, the implementer and/or designer may opt for mainly a software implementation. In yet other embodiments, the implementer and/or designer may opt for some combination of hardware, software, and/or firmware. Hence, there are several possible techniques by which the processes and/or devices and/or other technologies described herein may be effected, none of which is inherently superior to the other in that any vehicle or mobile device to be utilized is a choice dependent upon the context in which the vehicle or mobile device can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, singly and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" positioned prior to one or more goods, items, and/or services are intended to apply inclusively to either one or a plurality of those goods, items, and/or services.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An apparatus, comprising:
a vehicle-related information source operable to provide vehicle-related information, wherein the vehicle-related information is relevant to a vehicle or mobile device, or its occupants; and
a repeatably displaceable emanating element display configurable to display at least part of an at least one synchronously modifiable oriented non-holographic image that may be synchronously modified as perceivable by a viewer at least partially emanating from an at least one repeatably displaceable display emanating element based at least in part on receiving the vehicle-related information,
wherein the at least one repeatably displaceable display emanating element is a repeatably displaceable projection element that is configured to project light onto a correspondingly non-repeatably displacing, non-rotating and relatively stationary at-a-distance-plane of the repeatably displaceable emanating element display to form the non-holographic image,
wherein the vehicle-related information includes a rotational and/or angular velocity of a rotatable element; and
wherein the repeatably displaceable emanating element display is configured to produce a synchronized output display pattern synchronized with the rotatable element.

2. The apparatus of claim 1, wherein the repeatably displaceable emanating element display configurable to display at least part of an at least one synchronously modifiable oriented image that may be synchronously modified as perceivable by a viewer at least partially emanating from an at least one repeatably displaceable display emanating element comprises:
the repeatably displaceable emanating element display configurable to display at least part of an at least one moving synchronously modifiable oriented image that may be synchronously modified as perceivable by the viewer at least partially emanating from the at least one repeatably displaceable display emanating element.

3. The apparatus of claim 1, wherein the repeatably displaceable emanating element display configurable to display at least part of an at least one synchronously modifiable oriented image that may be synchronously modified as perceivable by a viewer at least partially emanating from an at least one repeatably displaceable display emanating element comprises:
the repeatably displaceable emanating element display configurable to display at least part of an at least one holographic synchronously modifiable oriented image that may be synchronously modified as perceivable by the viewer at least partially emanating from the at least one repeatably displaceable display emanating element.

4. The apparatus of claim 1, wherein the repeatably displaceable emanating element display configurable to display at least part of an at least one synchronously modifiable oriented image that may be synchronously modified as perceivable by a viewer at least partially emanating from an at least one repeatably displaceable display emanating element comprises:
the repeatably displaceable emanating element display configurable to display at least part of an at least one static synchronously modifiable oriented image that may be synchronously modified as perceivable by the viewer at least partially emanating from the at least one repeatably displaceable display emanating element.

5. The apparatus of claim 1, wherein the repeatably displaceable emanating element display configurable to display at least part of an at least one synchronously modifiable oriented image that may be synchronously modified as perceivable by a viewer at least partially emanating from an at least one repeatably displaceable display emanating element comprises:
the repeatably displaceable emanating element display configurable to display an at least part of an at least one text-based synchronously modifiable oriented image that may be synchronously modified as perceivable by the viewer at least partially emanating from the at least one repeatably displaceable display emanating element.

6. The apparatus of claim 1, wherein the repeatably displaceable emanating element display configurable to display at least part of an at least one synchronously modifiable oriented image that may be synchronously modified as perceivable by a viewer at least partially emanating from an at least one repeatably displaceable display emanating element comprises:
the repeatably displaceable emanating element display configurable to display the at least part of the at least one synchronously modifiable oriented image that may be synchronously modified as perceivable by the viewer at least partially emanating from the at least one repeatably displaceable display emanating element on to at least a displaceable portion of the vehicle or mobile device.

7. The apparatus of claim 1, wherein the repeatably displaceable emanating element display is configurable to display at least part of the at least one synchronously modifiable oriented image that may be synchronously modified as perceivable by the viewer based at least in part on a repetitive orientation of the at least one repeatably displaceable display emanating element.

8. The apparatus of claim 1, wherein the repeatably displaceable emanating element display is configurable to display at least part of the at least one synchronously modifiable oriented image that may be synchronously modified as perceivable by the viewer at least partially using a repeatably displaceable display emanating element image.

9. The apparatus of claim 1, wherein the repeatably displaceable emanating element display is configurable to display at least part of the at least one synchronously modifiable oriented image that may be synchronously modified as perceivable by the viewer at least partially using an optical image.

10. The apparatus of claim 1, wherein the repeatably displaceable emanating element display is configurable to display at least part of the at least one synchronously modifiable oriented image that may be synchronously modified as perceivable by the viewer at least partially using a moving image.

11. The apparatus of claim 1, wherein the repeatably displaceable emanating element display is configurable to display at least part of the at least one synchronously modifiable oriented image that may be synchronously modified as perceivable by the viewer at least partially using a processor-derived image.

12. The apparatus of claim 1, wherein the repeatably displaceable emanating element display is configurable to display at least part of the at least one synchronously modifiable oriented image that may be synchronously modified as perceivable by the viewer at least partially using a mote-based device image.

13. The apparatus of claim 1, wherein the repeatably displaceable emanating element display is configurable to display at least part of the at least one synchronously modifiable oriented image that may be synchronously modified as perceivable by the viewer at least partially using a static image.

14. The apparatus of claim 1, wherein the at least one repeatably displaceable display emanating element is at least partially repeatably rotationally displaceable.

15. The apparatus of claim 1, wherein the at least one repeatably displaceable display emanating element is at least partially repeatably translationally displaceable.

16. A system, comprising:
a sensor operable to provide vehicle-related information based at least in part on sensing a condition relating to an operation of a vehicle or mobile device or its occupants; and
a repeatably displaceable emanating element display configurable to display at least part of an at least one synchronously modifiable oriented non-holographic image that may be synchronously modified as perceivable by a viewer at least partially emanating from an at least one repeatably displaceable display emanating element at least partially in response to the sensor operable to provide the vehicle-related information based at least in part on the sensing the condition relating to the operation of the vehicle or mobile device or its occupants,
wherein the at least one repeatably displaceable display emanating element is a repeatably displaceable projection element that is configured to project light onto a correspondingly non-repeatably displacing, non-rotating and relatively stationary at-a-distance-plane of the repeatably displaceable emanating element display to form the non-holographic image,
wherein the vehicle-related information includes a rotational and/or angular velocity of a rotatable element; and
wherein the repeatably displaceable emanating element display is configured to produce a synchronized output display pattern synchronized with the rotatable element.

17. The system of claim 16, wherein the repeatably displaceable emanating element display at least partially comprises a movable repeatably displaceable emanating element display.

18. The system of claim 16, wherein the repeatably displaceable emanating element display at least partially comprises a static repeatably displaceable emanating element display.

19. The system of claim 16, wherein the repeatably displaceable emanating element display at least partially comprises a holographic repeatably displaceable emanating element display.

20. The system of claim 16, wherein the repeatably displaceable emanating element display at least partially comprises a text-based repeatably displaceable emanating element display.

21. The system of claim 16, wherein the repeatably displaceable emanating element display is configurable to display at least part of the at least one synchronously modifiable oriented image that may be synchronously modified as perceivable by the viewer based at least in part on a repetitive orientation of the at least one repeatably displaceable display emanating element.

22. The system of claim 16, wherein the repeatably displaceable emanating element display is configurable to display at least part of the at least one synchronously modifiable oriented image that may be synchronously modified as perceivable by the viewer at least partially using a repeatably displaceable display emanating element image.

23. The system of claim 16, wherein the repeatably displaceable emanating element display is configurable to display at least part of the at least one synchronously modifiable oriented image that may be synchronously modified as perceivable by the viewer at least partially using an optical image.

24. The system of claim 16, wherein the repeatably displaceable emanating element display is configurable to display at least part of the at least one synchronously modifiable oriented image that may be synchronously modified as perceivable by the viewer at least partially using a moving image.

25. An apparatus, comprising:
sensor means for deriving vehicle-related information based at least in part on quantifiably recording an operation of a vehicle or mobile device or its occupants; and
repeatably displaceable emanating element display means for displaying at least part of an at least one synchronously modifiable oriented non-holographic image as perceivable by a viewer that may be synchronously modified at least partially in response to the sensor means for deriving the vehicle-related information based at least in part on the quantifiably recording the operation of the vehicle or mobile device or its occupants,
wherein the at least one repeatably displaceable display emanating element is a repeatably displaceable projection element that is configured to project light onto a correspondingly non-repeatably displacing, non-rotating and relatively stationary at-a-distance-plane of the repeatably displaceable emanating element display to form the non-holographic image,
wherein the vehicle-related information includes a rotational and/or angular velocity of a rotatable element; and
wherein the repeatably displaceable emanating element display is configured to produce a synchronized output display pattern synchronized with the rotatable element.

26. The apparatus of claim 25, wherein the repeatably displaceable emanating element display means at least partially comprises a movable repeatably displaceable emanating element display means.

27. The apparatus of claim 25, wherein the repeatably displaceable emanating element display means at least partially comprises a static repeatably displaceable emanating element display means.

28. The apparatus of claim 25, wherein the repeatably displaceable emanating element display means at least partially comprises a holographic repeatably displaceable emanating element display means.

29. The apparatus of claim 25, wherein the repeatably displaceable emanating element display means at least partially comprises a text-based repeatably displaceable emanating element display means.

30. The apparatus of claim 25, wherein the repeatably displaceable emanating element display means is configurable to display at least part of the at least one synchronously modifiable oriented image that may be synchronously modified as perceivable by the viewer based at least in part on a repetitive orientation of the at least one repeatably displaceable display emanating element.

31. The apparatus of claim 25, wherein the repeatably displaceable emanating element display means is configurable to display at least part of the at least one synchronously modifiable oriented image that may be synchronously modified as perceivable by the viewer at least partially using a repeatably displaceable display emanating element image.

32. The apparatus of claim 25, wherein the repeatably displaceable emanating element display means is configurable to display at least part of the at least one synchronously modifiable oriented image that may be synchronously modified as perceivable by the viewer at least partially using an optical image.

33. A method, comprising:
generating a repeatably displaceable emanating element display that may display at least part of an at least one synchronously modifiable oriented non-holographic image based at least in part on alterable vehicle-related information, wherein the repeatably displaceable emanating element display may be synchronously modified as perceivable by a viewer at least partially by synchronizing an at least one repeatably displaceable display emanating element based at least in part on an orientation of the repeatably displaceable emanating element display as synchronously modified as perceivable by the viewer,
wherein the at least one repeatably displaceable display emanating element is a repeatably displaceable projection element,
wherein the vehicle-related information includes a rotational and/or angular velocity of a rotatable element; and
wherein generating the repeatably displaceable emanating element display includes producing a synchronized output display pattern synchronized with the rotatable element by projecting light onto a correspondingly non-repeatably displacing, non-rotating and relatively stationary at-a-distance-plane of the repeatably displaceable emanating element display to form the non-holographic image.

34. The method of claim 33, wherein the generating a repeatably displaceable emanating element display that may display at least part of an at least one synchronously modifiable oriented image based at least in part on alterable vehicle-related information, wherein the repeatably displaceable emanating element display may be synchronously modified as perceivable by a viewer at least partially by synchronizing an at least one repeatably displaceable display emanating element based at least in part on an orientation of the repeatably displaceable emanating element display as synchronously modified as perceivable by the viewer further comprises:
generating an illumination repeatably displaceable emanating element display that may display the at least part of the at least one synchronously modifiable oriented image based at least in part on the alterable vehicle-related information.

35. The method of claim 33, wherein the generating a repeatably displaceable emanating element display that may display at least part of an at least one synchronously modifiable oriented image based at least in part on alterable vehicle-related information is performed at least partially in response to an activity.

36. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via a networked communication system.

37. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via an 802.11 communication system.

38. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via an optical communication system.

39. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via a cell phone communication system.

40. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via a moving-image communication system.

41. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via a television communication system.

42. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via a video communication system.

43. The method of claim 33, wherein the generating a repeatably displaceable emanating element display that may display at least part of an at least one synchronously modifiable oriented image based at least in part on alterable vehicle-related information relies at least in part on the vehicle-related information that is at least partially transferred via a positional information communication system.

44. A method, comprising:
obtaining vehicle-related information associated with an operating parameter of a vehicle or mobile device, or its occupants; and
providing a repeatably displaceable emanating element display operable to display at least part of an at least one synchronously modifiable oriented non-holographic image at least partially in response to the obtaining vehicle-related information that may be synchronously modified as perceivable by a viewer at least partially by synchronizing an at least one repeatably displaceable display emanating element based at least in part on the obtaining vehicle-related information associated with the vehicle or mobile device, or its occupants, wherein the at least one repeatably displaceable display emanating element is a repeatably displaceable projection element, wherein the vehicle-related information includes a rotational and/or angular velocity of a rotatable element; and wherein synchronizing an at least one repeatably displaceable display emanating element includes producing a synchronized output display pattern synchronized with the rotatable element by projecting light onto a correspondingly non-repeatably displacing, non-rotating and relatively stationary at-a-distance-plane of the repeatably displaceable emanating element display to form the non-holographic image.

45. The method of claim 44, wherein the obtaining vehicle-related information associated with an operating parameter of a vehicle or mobile device, or its occupants comprises:

obtaining an external environment vehicle-related information associated with the vehicle or mobile device, or its occupants.

46. The method of claim 44, wherein the obtaining vehicle-related information associated with an operating parameter of a vehicle or mobile device, or its occupants comprises:

obtaining a hazard-based vehicle-related information associated with the vehicle or mobile device, or its occupants.

47. The method of claim 44, wherein the providing a repeatably displaceable emanating element display operable to display at least part of an at least one synchronously modifiable oriented image at least partially in response to the obtaining vehicle-related information that may be synchronously modified as perceivable by a viewer at least partially by synchronizing an at least one repeatably displaceable display emanating element comprises:

providing an illumination-based repeatably displaceable emanating element display operable to display the at least part of the at least one synchronously modifiable oriented image at least partially in response to the obtaining vehicle-related information that may be synchronously modified as perceivable by the viewer at least partially by synchronizing an at least one illumination-based repeatably displaceable display emanating element.

48. The method of claim 44, wherein the repeatably displaceable emanating element display is configurable to display at least part of the at least one synchronously modifiable oriented image that may be synchronously modified as perceivable by the viewer based at least in part on a repetitive orientation of the at least one repeatably displaceable display emanating element.

49. The method of claim 44, wherein the repeatably displaceable emanating element display is configurable to display at least part of the at least one synchronously modifiable oriented image that may be synchronously modified as perceivable by the viewer at least partially using a repeatably displaceable display emanating element image.

50. The method of claim 44, wherein the repeatably displaceable emanating element display is configurable to display at least part of the at least one synchronously modifiable oriented image that may be synchronously modified as perceivable by the viewer at least partially using a moving image.

* * * * *